United States Patent
Sodja et al.

(10) Patent No.: US 11,363,059 B2
(45) Date of Patent: Jun. 14, 2022

(54) DETECTION OF BRUTE FORCE ATTACKS

(71) Applicant: Microsoft Technology Licensing, LLC, Redmond, WA (US)

(72) Inventors: Cole Sodja, Seattle, WA (US); Justin Anthony Natelli Carroll, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 16/833,041

(22) Filed: Mar. 27, 2020

(65) Prior Publication Data

US 2021/0185084 A1 Jun. 17, 2021

Related U.S. Application Data

(60) Provisional application No. 62/947,828, filed on Dec. 13, 2019.

(51) Int. Cl.
*H04L 29/06* (2006.01)
*H04L 9/40* (2022.01)

(52) U.S. Cl.
CPC ...... *H04L 63/1458* (2013.01); *H04L 63/0263* (2013.01); *H04L 63/1416* (2013.01);
(Continued)

(58) Field of Classification Search
CPC ............. H04L 63/1458; H04L 63/0263; H04L 63/1416; H04L 63/1425; H04L 63/1433;
(Continued)

(56) References Cited

U.S. PATENT DOCUMENTS

| | | | | |
|---|---|---|---|---|
| 5,046,846 A | * | 9/1991 | Ray | G01N 21/35 702/30 |
| 7,913,306 B2 | * | 3/2011 | Apap | G06F 21/552 726/22 |

(Continued)

FOREIGN PATENT DOCUMENTS

| | | | | | |
|---|---|---|---|---|---|
| CN | 102792635 A | * | 11/2012 | | H04L 63/1425 |
| CN | 103563293 A | * | 2/2014 | | G06F 21/577 |

(Continued)

OTHER PUBLICATIONS

"AbuseIPDB", Retrieved from: https://www.abuseipdb.com/, Retrieved on: Jul. 21, 2021, 2 Pages.

(Continued)

*Primary Examiner* — John B King
(74) *Attorney, Agent, or Firm* — Schwegman Lundberg & Woessner, P.A.

(57) ABSTRACT

The disclosed embodiments determine a plurality of anomaly indications for a plurality of corresponding time series. A multi-modal model is defined for each time series. A first distribution is compared against a time series when the time series values fall within a first range and a second distribution is compared against the time series when the time series values fall with a second range. Based on the comparison, an indication of anomaly is generated for the time series. The indicators of anomaly for each time series are then combined using Fisher's method in some embodiments. The resulting combined anomaly indication is used to determine whether a network is experiencing a brute force attack.

20 Claims, 12 Drawing Sheets

(52) U.S. Cl.
CPC ...... *H04L 63/1425* (2013.01); *H04L 63/1433* (2013.01); *H04L 63/20* (2013.01)
(58) Field of Classification Search
CPC ..... H04L 63/20; H04L 63/205; H04L 63/083; G06F 21/554
See application file for complete search history.

(56) References Cited

U.S. PATENT DOCUMENTS

| | | | | |
|---|---|---|---|---|
| 8,230,262 | B2* | 7/2012 | Li | G06F 11/008 714/39 |
| 9,009,818 | B2* | 4/2015 | Tuvell | G06F 21/564 713/188 |
| 10,728,273 | B1* | 7/2020 | Okubo | H04L 63/0263 |
| 2004/0034465 | A1* | 2/2004 | Spiesberger | G06F 17/18 702/150 |
| 2011/0270782 | A1* | 11/2011 | Trenner | G06Q 40/10 705/36 R |
| 2014/0090054 | A1* | 3/2014 | Bolzoni | H04L 63/0245 726/22 |
| 2014/0380422 | A1* | 12/2014 | Su | H04L 63/1433 726/4 |
| 2015/0381648 | A1* | 12/2015 | Mathis | H04L 41/147 726/22 |
| 2016/0004580 | A1 | 1/2016 | Momot et al. | |
| 2019/0171825 | A1* | 6/2019 | Khi | G06F 21/6254 |

FOREIGN PATENT DOCUMENTS

| | | | | |
|---|---|---|---|---|
| CN | 104967587 | A * | 10/2015 | ............. G06N 7/005 |
| CN | 107210927 | A * | 9/2017 | ............. G06F 17/18 |
| CN | 107690776 | A * | 2/2018 | ........... H04L 41/142 |
| CN | 106104496 | B * | 7/2019 | .......... G06F 11/3409 |
| JP | 2017126978 | A * | 7/2017 | ............. G06F 21/85 |

OTHER PUBLICATIONS

Davis, et al., "Microsoft Defender for Endpoint", Retrieved from: https://docs.microsoft.com/en-us/microsoft-365/security/defender-endpoint/miorosoft-defender-endpoint?view=o365-worldwide#edr, Jun. 10, 2021, 6 Pages.

Simpson, et al., "Configure and Manage Microsoft Threat Experts Capabilities", Retrieved from: https://docs.microsoft.com/en-us/microsoft-365/security/defender-endpoint/configure-microsoft-threat-experts?view=o365-worldwide#receive-targeted-attack-notification-from-microsoft-threat-experts, Jun. 2, 2021, 11 Pages.

Simpson, et al., "Microsoft Threat Experts", Retrieved from: https://docs.microsoft.com/en-us/microsoft-365/security/defender-endpoint/microsoft-threat-experts?view=o365-worldwide, Jun. 11, 2021, 5 Pages.

Sodja, et al., "Data Science for Cybersecurity: A Probabilistic Time Series Model for Detecting RDP Inbound Brute Force Attacks", Retrieved from: https://www.microsoft.com/security/blog/2019/12/18/data-science-for-cybersecurity-a-probabilistic-time-series-model-for-detecting-rdp-inbound-brute-force-attacks/, Dec. 18, 2019, 20 Pages.

Abdou, et al., "What Lies Beneath? Analyzing Automated SSH Bruteforce Attacks", In Proceedings of International conference on Passwords, Dec. 7, 2015, 20 Pages.

Javed, et al., "Detecting stealthy, distributed SSH brute-forcing", In Proceedings of the 2013 ACM SIGSAC conference on Computer & communications security,Nov. 4, 2013, pp. 85-96.

Najafabadi, et al., "Detection of SSH Brute Force Attacks Using Aggregated Netflow Data", In Proceedings of IEEE 14th International Conference on Machine Learning and Applications, Dec. 9, 2015, pp. 283-288.

Najafabadi, et al., "Machine Learning for Detecting Brute Force Attacks at the Network Level", In Proceedings of the IEEE International Conference on Bioinformatics and Bioengineering, Nov. 10, 2014, pp. 379-385.

Sexton, et al., "Attack chain detection", Published in Statistical Analysis and Data Mining, Sep. 26, 2015, pp. 354-363.

Sperotto, et al., "Hidden Markov Model Modeling of SSH Brute-force Attacks", In Proceedings of International Workshop on Distributed Systems: Operations and Management, Oct. 27, 2009, pp. 164-176.

Aswani, et al., "Topic Modeling of SSH Logs Using Latent Dirichlet Allocation for the Application in Cyber Security", In Proceedings of the Systems and Information Engineering Design Symposium, Apr. 24, 2015, pp. 75-79.

Lee, et al., "Heavy-Tailed Distribution of the SSH Brute-Force Attack Duration in a Multi-user Environment", In Journal of the Korean Physical Society, vol. 69, Issue 2, Jul. 27, 2016, pp. 253-258.

"International Search Report and Written Opinion issued in PCT Application No. PCT/US2020/064455", dated Mar. 16, 2021, 10 Pages.

* cited by examiner

| Org | Machine | TIME | Rank | Score | isCompromised | #DayDetected | #MachineWithIP | #RdpInbound | #FailedLogin | #UserFail | UnusualIPLogon | TopImboundUnusualIP |
|---|---|---|---|---|---|---|---|---|---|---|---|---|
| X1 | X11 | 10/24/2019 0:47 | 1 | 10^8 | TRUE | 7 | 39 | 187 | 99 | 31 | 81.171.81.60 | 185.156.177.179\|185.156.177.122\|185.156.177.61\|185.19.4.16\|185.156.177.104\|185.156.177.237\|185.156.177.121\|185.100.87.246\|185.209.0.46\|185.176.221.214 |
| X2 | X11 | 10/24/2019 21:30 | 2 | 10^6 | TRUE | 1 | 21 | 220 | 95 | 72 | NA | 185.27.194.229\|185.31.160.67\|185.56.81.52\|185.97.114.170\|185.191.47\|185.12.78.183\|185.156.177.202\|185.209.0.7\|185.156.177.98\|185.19.4.16 |
| X2 | X11 | 10/24/2019 17:29 | 3 | 10^6 | FALSE | 2 | 4 | 274 | 99 | 53 | NA | 109.124.86.220\|145.239.165.148\|212.92.11.25 |

FIG. 7

DETECTION OF BRUTE FORCE ATTACKS

CROSS REFERENCE TO RELATED APPLICATIONS

This application claims priority to U.S. Provisional Patent Application No. 62/947,828, filed Dec. 13, 2019, and entitled "Detection of Brute Force Attacks." The contents of this prior application are considered part of this application, and are hereby incorporated by reference in their entirety.

BACKGROUND

Computers exposed to the internet are an attractive target for adversaries because they present a simple and effective way to gain access to a network. Performing a brute force attack does not necessarily require a high level of expertise or a sophisticated use of exploits. Instead, in some scenarios, attackers can utilize off-the-shelf tools to scan the Internet for potential victims and leverage similar such tools for conducting the brute force attack.

Attackers target servers having relatively weak passwords and no multi-factor authentication, virtual private networks (VPNs), and other security protections. Through brute force attacks, threat actor groups have gained access to target machines and have conducted many follow-on activities like ransomware and coin mining operations.

BRIEF DESCRIPTION OF THE DRAWINGS

FIG. 7 shows example ranking of detected RDP inbound brute force attacks.

DETAILED DESCRIPTION

Figure 1:
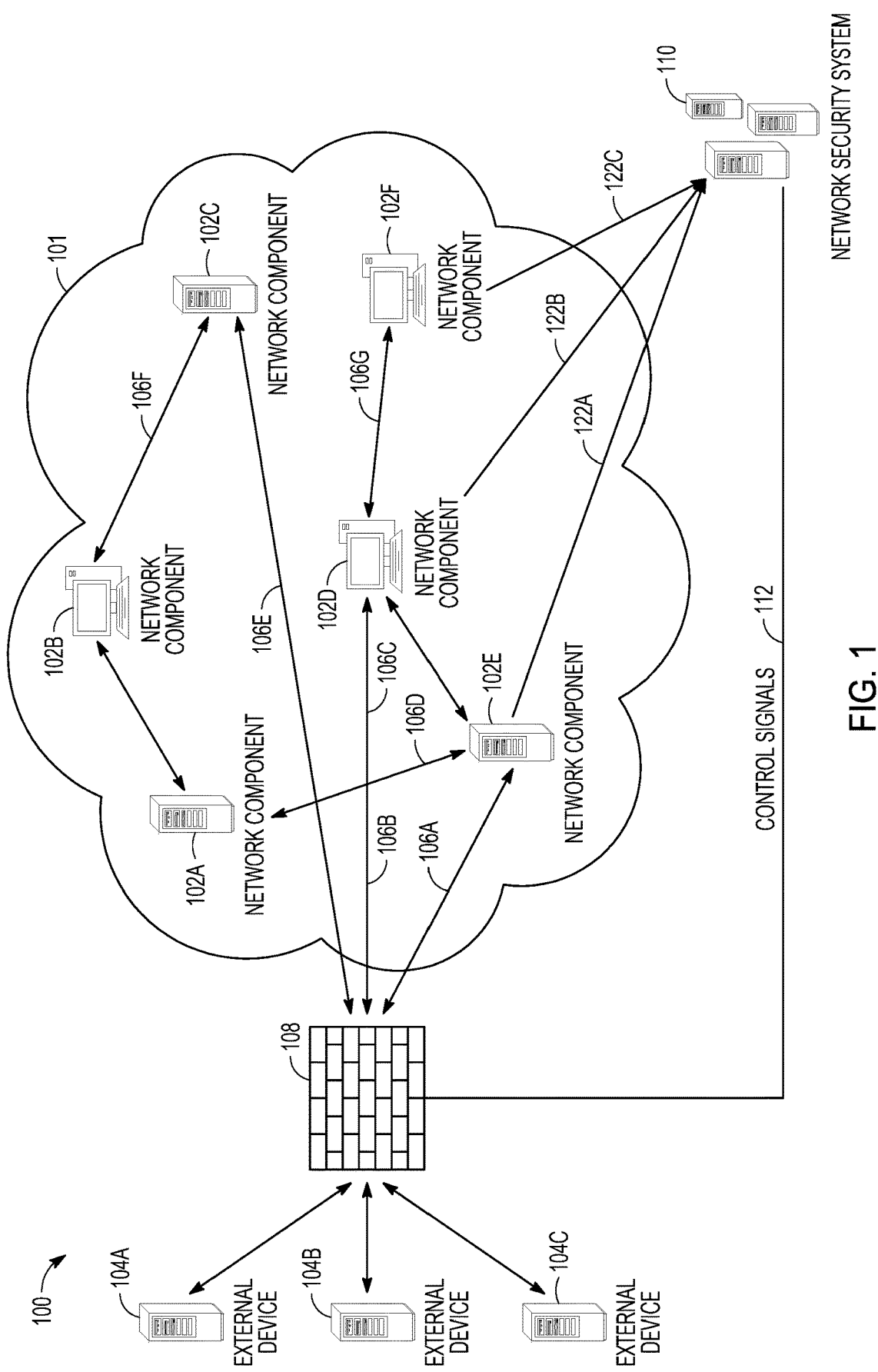
FIG. 1 is an overview diagram of an example embodiment of a network.

Brute force attacks represent a technical problem in that they can be difficult to detect while generating a manageable number of false positives. In a brute force attack, adversaries can attempt to sign into an account by effectively using one or more trial-and-error methods. In some instances of brute force attacks, failed logins are associated with these attacks. These failed logins can occur over a very short time frequency, typically minutes or even seconds. A brute force attack might also involve an attempt to access one or multiple accounts using valid usernames. The valid usernames may be obtained by the attacker via traditional credential theft techniques or via use of common usernames such as "administrator." The same holds for password combinations. In detecting brute force attacks, some of the disclosed embodiments focus on a source Internet Protocol (IP) address and username, as in at least some cases, password data is not available.

In some operating environments, login failures are logged to a log file or other logging facility. These log entries may include an event code indicating the login failure, along with associated information, such as a username used in the login attempt. For example, in the Microsoft Windows operating system, whenever an attempted login fails for a local machine, Event Tracing for Windows (ETW) registers Event ID 4625 with the associated username.

Moreover, source IP addresses associated with the failed login attempt are also recorded in at least some environments. This information can be useful in assessing if a machine is under brute force attack. This information, in combination with indications of login failures (e.g. Event ID 4624) for non-server machines, is useful to understand which login sessions were successfully created. Based on this understanding, indications of a compromised machine are generated.

Disclosed are embodiments that utilize these and/or other signals which have proven valuable in detecting and, in some embodiments, mitigating brute force attacks. In some embodiments, this capability may be deployed via Microsoft Threat Experts, a managed threat hunting service in Microsoft Defender Advanced Threat Protection. Other embodiments are deployed in non-Microsoft environments or environments including solutions delivered by a mix of different vendors.

In some embodiments, the disclosed embodiments generate one or more alerts. The alerts are directed to, in various embodiments, one or more of system administrators, security vendors, end users, or other contacts. In some embodiments, the detection of anomalous activity indicating a brute force attack causes programmatic reconfiguration of network security devices such as firewalls, proxies, routers, switches, or other network devices to mitigate the brute force attack. For example, in some embodiments, an access control policy of one or more network security devices is updated based on a likelihood of a brute force attack. The programmatic reconfiguration is performed, in some embodiments, without human intervention. For example, a firewall is reconfigured in some embodiments to prevent access to a network by a device identified as initiating at least a portion of an identified brute force attack. In some embodiments, more restrictive access policies are progressively deployed to network security devices until the brute force attack is successfully mitigated (e.g. a level of anomalous activity drops below a predetermined threshold). These access policies are progressively deployed, in some embodiments, by programmatically configuring one or more firewalls deployed to control access to the network.

Some of the disclosed embodiments recognize that observation of a sudden, relatively large count of particular types of events (e.g. Event ID 4625) associated with network connections (e.g. RDP), while infrequent in some environments, does not necessarily imply that a machine is under attack. For example, a script that performs the following actions would appear to be suspicious when evaluating a time series of counts of failed logins. However, such an example is most likely not malicious:

uses an expired password retries login attempts every N-minutes with different usernames over a public IP address within a range owned by the enterprise In contrast, behavior that includes the following events can be indicative of an attack:

extreme counts of failed login from many unknown usernames never previously successfully authenticated from multiple different connections (e.g. multiple different RDP connections)

from new inbound IP addresses, especially with history of abuse

The above example demonstrates that understanding the context of failed logins and inbound connections can be useful in discriminating between true positive (TP) and false positive (FP) brute force attacks. Such understanding provides for improved precision in detecting brute force attacks.

In developing the disclosed embodiments, historical data from several previous months was obtained. This historical data was later analyzed to provide insights into the types of brute force attacks occurring across the measured environments during those previous months. Out of approximately 45,000 machines that had both public IP connections (e.g., RDP) and at least one (1) network failed login, on average, several hundred machines per day had a high probability of undergoing one or more brute force attack attempts. Of the subpopulation of machines with detected brute force attacks, the attacks lasted 2-3 days on average, with about 90% of cases lasting for 1 week or less, and less than 5% for 2 or more weeks. Based at least partly on insights gained via the analysis of the historical data, the presently disclosed embodiments were then developed.

To detect brute force attacks, some of the disclosed embodiments implement a technical solution to the technical problem of brute force attacks that models a distribution of operational parameter values as a finite mixture of distributions. The use of a mixture model in detection of a brute force attack recognizes the multi-modal nature of operational parameter values experienced by a computer network. By comparing operational parameter values to a distribution appropriate for a network environment during a given time period, the disclosed embodiments adapt their detection of brute force attacks as needed to reduce a number of false positives while still providing accurate detection of real brute force attacks.

Each distribution in the mixture model is defined by one or more parameters. The parameters and thus the distributions themselves are dynamically updated based on additional operational parameter values as those operational parameter values are observed. The disclosed embodiments compare observed operational parameter values to particular distributions in the mixture model based on dynamically determined thresholds that determine which distribution is used for the comparison. In some embodiments, multiple time series are each modeled as separate mixtures of distributions, with each mixture model defined by its own distribution parameters and comparison thresholds. By recognizing that one or more time series of operational parameter values may be multi-modal, and thus are best compared using a mixture model of distributions, the disclosed embodiments are able to more accurately detect anomalous events, while reducing the probability of false positives.

FIG. 1 is an overview diagram 100 of a network that implements one or more of the disclosed embodiments. FIG. 1 shows a network 101. The network 101 includes a plurality of network components 102A-F. FIG. 1 also shows devices external 104A-C to the network 101. Network components 102A-F within the network 101 and external devices 104A-C outside the network 101 communicate with each other. Examples of this communication is illustrated in FIG. 1 as arrows 106A-G (not all arrows are labeled to preserve figure clarity).

Access to the network 101 is controlled by a firewall 108. FIG. 1 also shows a network security system 110. In some embodiments, the network security system 110 collects information on the communication between network components 102A-F and/or external devices 104A-C represented by the arrows 106A-G. The network security system 110 also collects, in some embodiments, operational parameter values of one or more of the network components 102A-F. As discussed in more detail below, based on information indicating the communications, the disclosed embodiments provided for improved methods of detecting a brute force attack on the network 101. In some embodiments, the network security system 110 sends one or more control signals 112 to the firewall 108. The control signals 112 configure one or more network access policies for one or more of the devices 102A-F.

The network security system 110 receives operational parameter values from one or more of the network components 102A-F. The operational parameter values are received by the network security system 110 via messages transmitted from the network components (directly or indirectly) to the network security system 110. These messages are shown as messages 122A-C. The operational parameter values provided by the one or more network components 102A-C are provided, in at least some embodiments, as a time series of values. In other words, the operational parameter values are periodically, or at multiple times, at regular or irregular intervals, measured, and then communicated to the network security system 110.

The network security system 110 processes the operational parameter values according to the methods discussed herein in order to determine a probability that the network 101 is experiencing a brute force attack. For example, the analysis performed by the network security system 110 determines, in some cases, that one or more of the external devices 104A-C is initiating a brute force attack on the network 101.

Figure 2A:
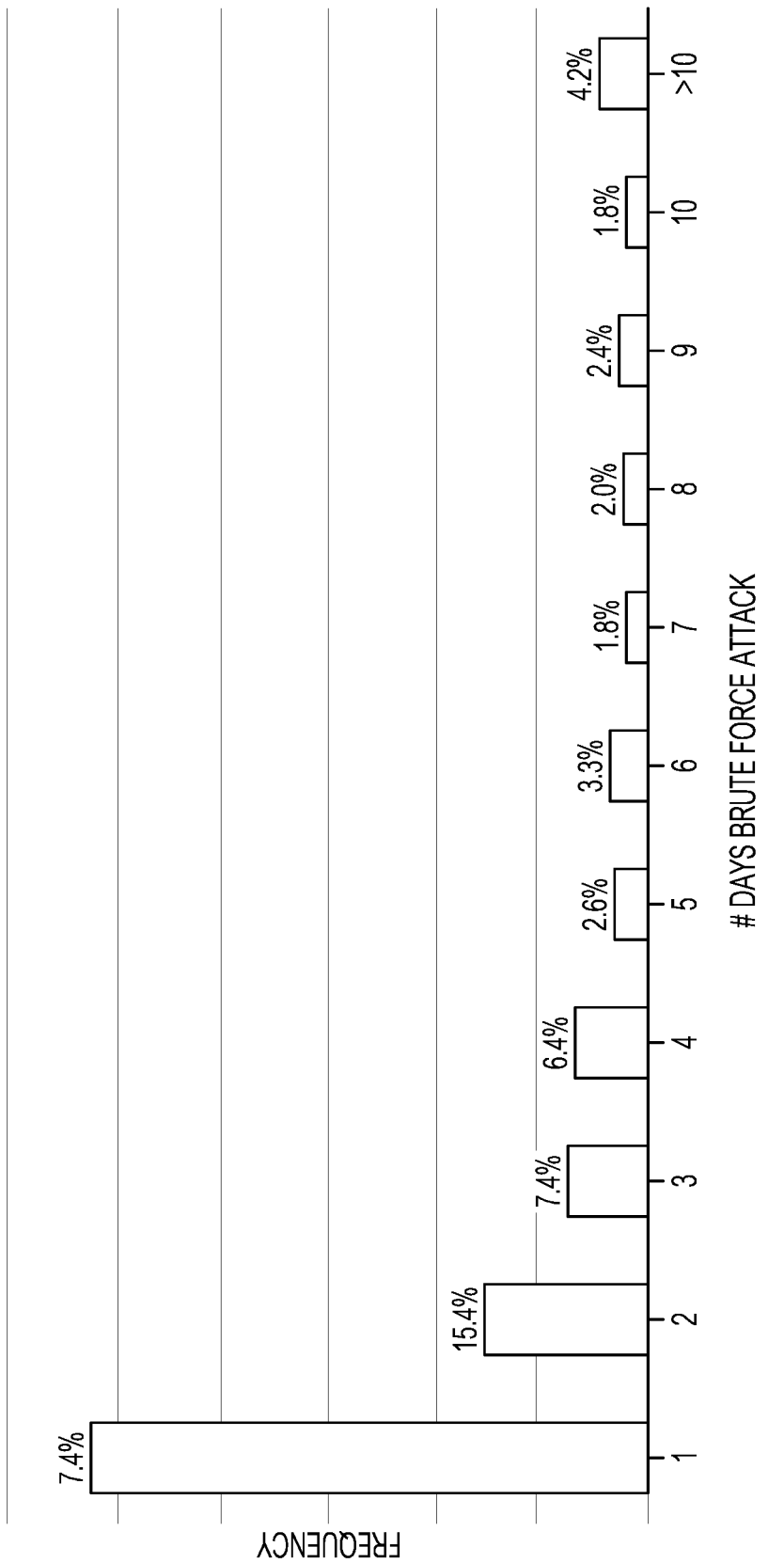
FIG. 2A shows an empirical distribution in number of days per machine where one or more brute force attacks were observed.

FIG. 2A shows an example empirical distribution of a number of days devices of a network experienced a brute force attack. Large counts of failed logins are often associated with brute force attacks. In the example of FIG. 2A, 90% of brute force attacks exhibit greater than ten attempts, with a median larger than 60. In addition, unusual daily counts have a high positive correlation with large counts in shorter time windows (see FIG. 2B). The number of extreme failed logins per day occurred under two hours typically, with about 40% failing in under thirty minutes.

Figure 2B:
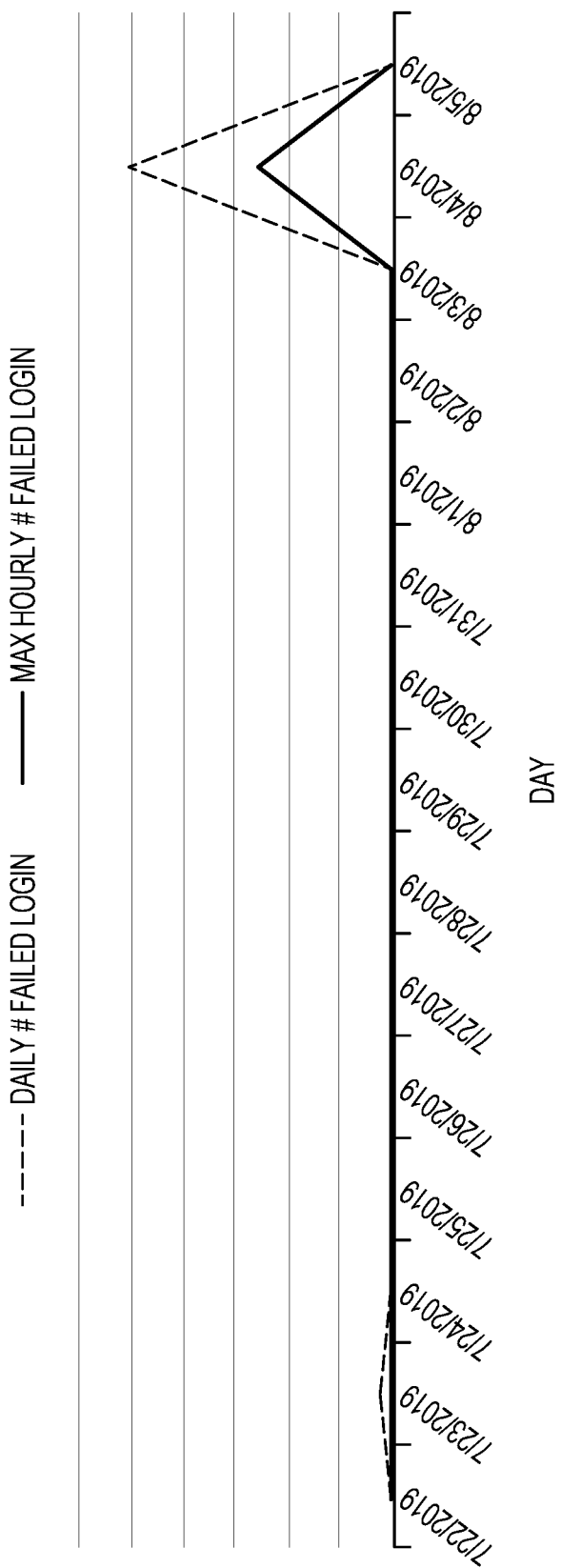
FIG. 2B shows an example count of daily and maximum hourly network failed logins for a local machine under brute force attack.

FIG. 2B shows example counts of daily and maximum hourly network failed logins for a local machine under brute force attack. While detection logic based on thresholding a count of failed logins during a daily or finer grain time window can detect many brute force attacks, this can produce too many false positives. Relying on such a strategy will also result in false negatives, resulting in missed compromises of a network. We identified several instances of brute force attacks that generated fewer than five to ten failed attempts daily, but often persisted for many days. This attack pattern avoids extreme counts at any point in time. For such a brute force attack, thresholding the cumulative number of logins over time that are unsuccessful across time demonstrated efficacy, as discussed below with respect to FIG. 3.

Figure 3:
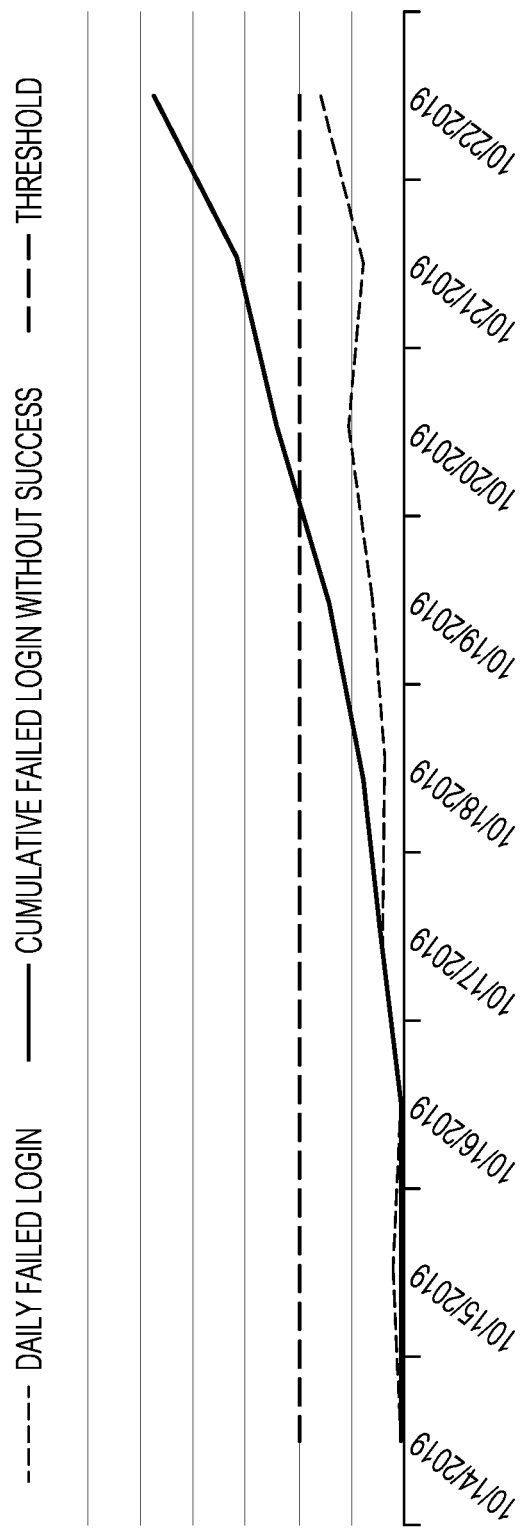
FIG. 3 shows example daily and cumulative failed network logins.

FIG. 3 shows daily and cumulative failed network logins. Looking at counts of network failed logins provides a useful but incomplete picture of RDP brute force attacks. This can be further augmented with additional information about the failed login, such as the failure reason, time of day and day of week, as well as the username itself. An especially strong signal is the source IP of the inbound RDP connection. Knowing if the external IP has a high reputation of abuse, as can be looked up on sites like https://www.abuseipdb.com/, can directly confirm if an IP is a part of an active brute force.

Unfortunately, not all IP addresses have a history of abuse, and it can be expensive to retrieve information about many external IP addresses on demand. Maintaining a list of suspicious IPs is an option, but relying on this can result in false negatives as inevitably, new IPs continually occur, particularly with the adoption of cloud computing and ease of spinning up virtual machines. A generic signal that can augment failed login and user information is counting distinct RDP connections from external IP addresses. Again, extreme values occurring at a given time or cumulated over time can be an indicator of attack.

Figure 4B:
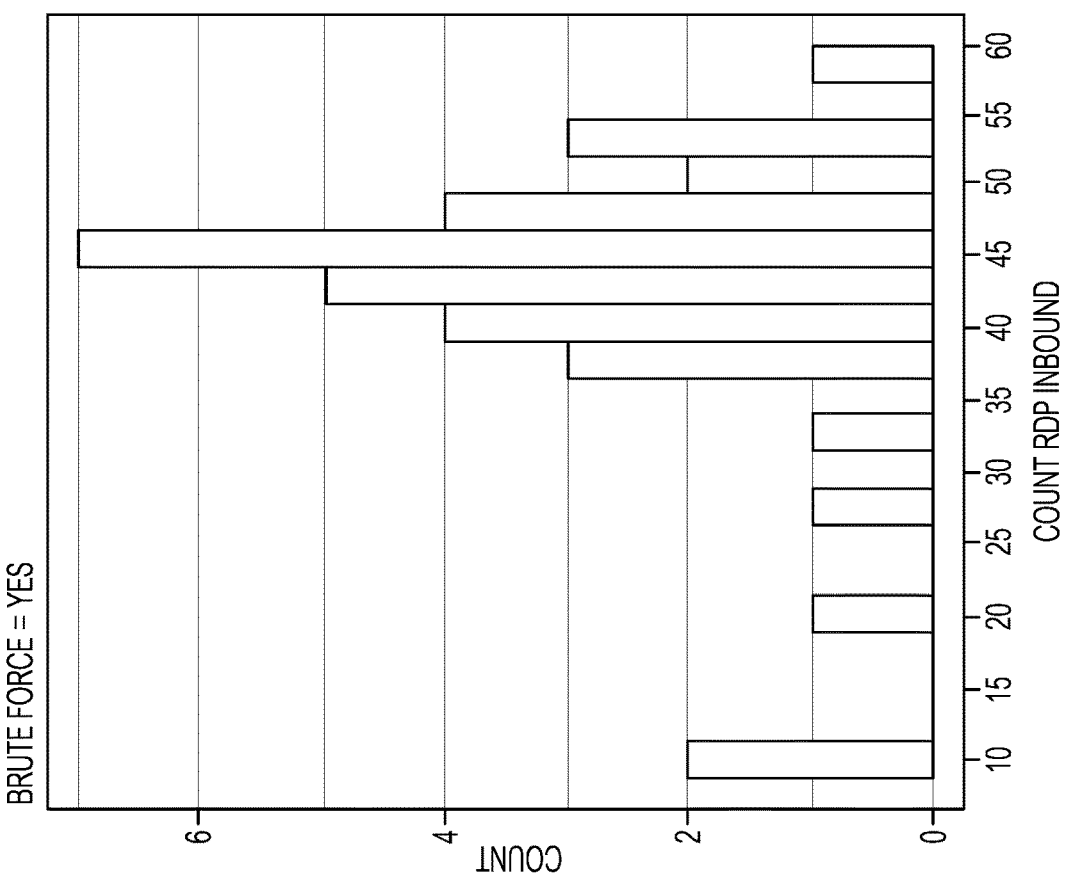
FIGS. 4A-B shows two histograms including example daily counts of remote desktop protocol (RDP) public connections per machine in an example enterprise with known brute force attacks.
Figure 4A:
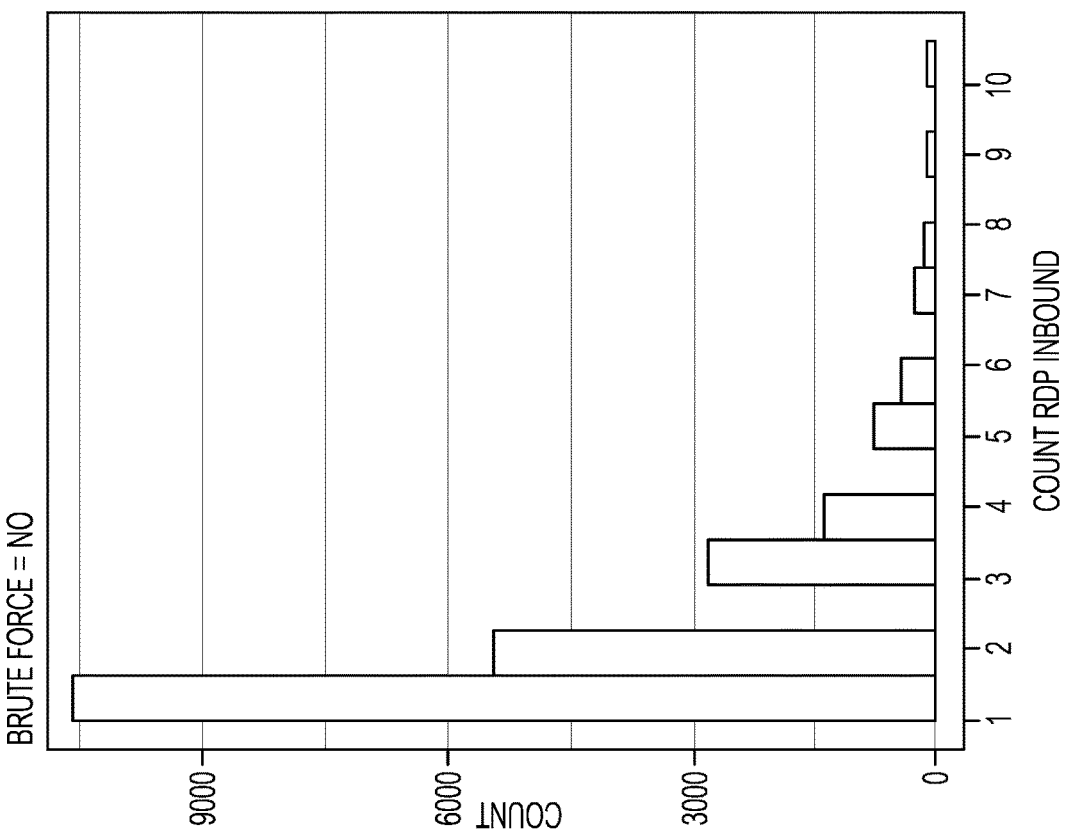

FIGS. 4A and 4B show example histograms (i.e., counts put into discrete bins) of daily counts of RDP public connections per machine that occurred for an example enterprise with known brute force attacks. It's evident that normal machines have a lower probability of larger counts compared to machines attacked.

Given that some enterprises have machines under brute force attack daily, the priority may be to focus on machines that have been compromised, defined by a first successful login following unsuccessful attempts from suspicious source IP addresses or unusual usernames. In embodiments directed to Microsoft Windows operating systems, Windows logs, Event ID 4624 can be leveraged to measure successful login events for local machine in combination with unsuccessful logins (e.g. Event ID 4625).

Out of the hundreds of machines with RDP brute force attacks detected in our analysis, we found that about 0.08% were compromised. Furthermore, across all enterprises analyzed over several months, on average about one machine was detected with high probability of being compromised resulting from an RDP brute force attack every 3-4 days.

Figure 5:
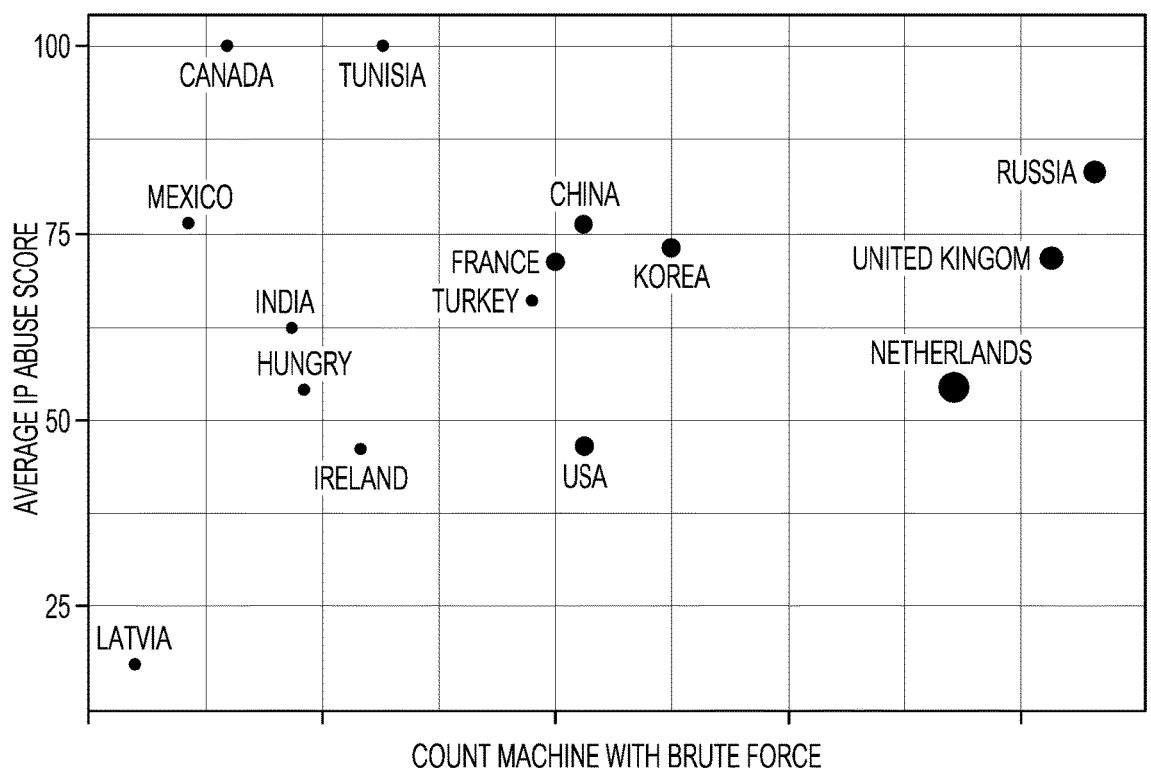
FIG. 5 is a bubble chart of example IP abuse score versus counts of machine with inbound RDP.

FIG. 5 shows a bubble chart of example average abuse scores of external IPs associated with RDP brute force attacks that successfully compromised machines. The size of the bubbles is determined by the count of distinct machines across the enterprises analyzed having a network connection from each IP. While there is diversity IPs originate, Netherlands, Russia and United Kingdom have a larger concentration of inbound RDP connections from high-abuse IP.

A takeaway from our analysis is that successful brute force attempts are not uncommon; therefore, it's critical to monitor at least the suspicious connections and unusual unsuccessful logins that result in authenticated login events. In the following sections we describe a methodology to do this.

Reliance on thresholding of operational parameter values such as a number of unsuccessful attempts per machine for detecting brute force attacks can be noisy and may result in many false positives. For example, such an approach can generate false positives in a situation when a script has been preconfigured with an outdated password and continuously attempts to login using the invalid password.

To avoid problems associated with basic thresholding, at least some of the disclosed embodiments utilize a plurality of contextually relevant signals, such as:

a timing, type, and count of unsuccessful login attempts username history
a type and frequency of network connections
first-time username from a new source machine with a successful login These examples can be extended to include indicators associated with a brute force attack, such as counts of detected port scanning.

At least some of the disclosed embodiments analyze one or more of the following per machine (or device) signals when determining whether an RDP inbound brute force attack is in progress or has previously occurred:

unsuccessful login and RDP connections: hour of day and day of week. This data is represented, in various embodiments, via a time series indicating counts of unsuccessful logins, and/or a separate time series indicating counts of successful logins. These time series are correlated with time to identify counts of unsuccessful or failed logins per hour and/or day as needed. These time series are generated, in various embodiments, on a per device and/or a per user/source IP basis. In some embodiments, these time series may be aggregated across time periods. For example, a time series representing weekly effects may be generated (e.g. activity Monday-Wednesday may be greater, in some cases, than end of work week or weekend activity for example). Some embodiments generate time series that accumulate counts across weeks.

Time delay between one or more failed or unsuccessful logins and a successful logon. For example, a time series indicating user account information such as one or more of a user account name, an IP address, a time of a last login failure, and a time of a last login success is generated in some embodiments.

Event ID 4625 logon type (filtered to network and Remote Interactive). This time series provides login type information for each login attempt and/or successful login. In some embodiments, the login attempts are remote desktop protocol (RDP) login attempts. In some embodiments, the time series is an ordinal time series. In some embodiments, login type information, such as a login type is represented using standard login type codes, such as code=3 for network login, code=10 for remote login, and code=1 for local console-initiated logins.

Event ID 4625 failure reason (filtered to %%2308, %%2312, %%2313). Some embodiments generate a categorical time series indicating a code for a login failure reason. For example, %%2313 is a code for "unknown username or bad password."

A cumulative count of each distinct or unique usernames that failed to login without a successful login (or without a subsequent successful login). Some embodiments include one or more time series relating to a single device or across multiple devices. For example, a first time series communicates, in some embodiments, a count C of distinct usernames that attempted to login and failed at a particular device. A second time series communicates that a second number "k" out of the C distinct users also failed to login to other devices.

A count (and cumulative count) of failed or unsuccessful logins. As discussed above.

A count (and cumulative count) of RDP inbound external IP addresses. In some embodiments, a time series provides counts of distinct, external IP addresses per device over time, per device per IP address, and/or per IP address (which may include IP addresses across enterprise networks). Some embodiments include an additional time series of counts of a particular IP address across devices over time. In various embodiments, these time series are per machine/device and/or across devices. For example, user and IP address statistics are examined, in some embodiments, at both per machine and across machines. Counts of failed/success/network connections are examined, in some embodiments on a per machine basis. Some embodiments include a time series of cumulative counts, which provide counts of similar data as described above, except that the counts are provided for longer time periods. For example, in some embodiments, a first time series provides a count for a period of time, wherein the period of time is specified via a configurable parameter (e.g. hourly). These embodiments may also provide a second time series including a cumulative count of the parameter for a longer time period (e.g. twelve hours, 24 hours, one day, two days, three days, one week, or any other longer period of time).

A count of other machines having RDP inbound connections from a common device or at least devices having equivalent IP addresses. This time series correlates, in some embodiments, counts of IP addresses that have attempted logins on multiple devices. Described another way, the time series indicates counts of at least two devices that have RDP inbound connections from a common device. In at least some embodiments, a time series of these counts is generated for each device included within a monitored network. Thus, in these embodiments, the count represents, for a particular device, a count of devices having an inbound connection with a source IP address that is equivalent to an inbound connection source address on the particular device.

In some embodiments, each time series or signal is scored for its indication of a brute force attack. In some embodiments, hourly time windows are the lowest time granularity. In other embodiments, other periods of time (a minute, five minutes, etc.) are used as the shortest time window for a time series. One or more additional time series can be generated by accumulating the lowest time granularity time series. For example, in some embodiments, some time series aggregate multiple hour time series within a day. In some embodiments, some time series aggregate granular time series across multiple days accounting for specific daily and weekly periodicity effects. Additionally, some time series are aggregated across multiple devices, and across multiple networks in some embodiments.

Let t be a time window, and T represent an interval of multiple time windows at a higher temporal frequency than t. The discussion below defines $y_t$ to be a lowest level univariate time series per each signal type and per single or multiple devices, and $y_T$ be an aggregation of $y_t$ for the time frequency T.

A first signal is a categorical time series of logon type (e.g. Event Id 4625) per device per t. For each device in a network, $y_t=[("2", count_t), ("3", count_t) \ldots, ("11", count_t)]$, where "2", "3" and "11" are examples of login types. For example, "2" is a sign-on at a keyboard, "3" is a connection to a shared folder on the device from elsewhere in the network, etc. Of particular interest for monitoring inbound brute force were logon types "3" and "10". The $count_t$ represents a total number of failed logins at time t of the specified login type. In some embodiments, the count is determined across usernames and IP addresses group.

A second signal is a categorical time series of failure reason (e.g. Event ID 4625) per device per t per logon type. For each device in a network, $y_t=[("2: \%\%2309", count_t), ("3:\%\%2313", count_t) \ldots, ("11:\%\%2304", count_t)]$, where each entry of the time series $y_t$ includes the logon type e.g. "2:", "3:", "11:"), a failure reason code (e.g. "%%2309"), and a count. For example, the failure reason %%2308 describes that the users attempting to login have not been granted access on the device. The $count_t$ term represents a total number of failed logins at time t for the specified logon type and failure reason. In some embodiments, the total number of failed logins are counted across usernames. Some embodiments generate a time series of $count_t$ per IP address. In some embodiments, a time series is generated that aggregates $count_t$ values for a group of IP addresses having an associated reputation or anomaly score that meets a predetermined criterion (e.g., reputation or score is less than a predetermined threshold).

A third signal in some embodiments is a time series aggregated failed login counts across multiple login types and/or multiple login failure reasons. Thus, these embodiments contemplate a third signal comprised of one or more combinations of possible login types and one or more combinations of possible login failure reasons. In some embodiments, this signal is generated on a per device basis. For each device in a network and set of logon type and failure reason time series, $y_t$=count of total number of failed logins at time t across username and IP addresses. For example, $y_t$ can be counts summed across possible login types 3 and 10, and login failure reasons in (%%2308, %%2312, %%2311, %%2313).

A fourth signal in some embodiments is a cumulative count of failed logins per device per T. The cumulative count is filtered by one or more logon types and login failure reasons. For each device in a network and the filtered logon type(s) and failure reason(s), the time series, $y_T=\Sigma_{t \in T} y_t$, where $y_t$ is a count of a failed login signal.

A fifth signal in some embodiments is a cumulative count of failed logins per device per T across a subset of one or more logon types and failure reasons. For each device in a network and set of logon type and failure reason time series, $y_T=\Sigma_{t \in T} y_t$, where $y_t$ is the count of a failed login signal. Thus, a difference between the fourth and fifth signal is that the fifth signal includes a subset of logon types relative to the fourth signal. For example, in some embodiments, the fifth signal indicates login failures having reasons associated with new (or unknown) usernames, and a logon type indicating a network connection (e.g. the login attempt was initiated from outside the monitored network or at least not via a console of the machine).

A sixth signal in some embodiments is a total count of remote desktop protocol (RDP) inbound public source addresses per device per time t. In other words, the sixth signal represents, in some embodiments, how many different source addresses are attempting RDP connections on a device during the time period t. Thus, the sixth signal provides, for each device in a network, RDP source addresses that are public. Thus, the sixth signal can be defined, in some embodiments, as $y_t$=a count of total distinct IP source RDP addresses per t.

A seventh signal in some embodiments is a cumulative count of RDP inbound public source address per device. For each device in a network and RDP network connection, $y_T = \Sigma_{t \in T} y_t$ where $y_t$ is the count of RDP inbound connections. The seventh signal accumulates the count for a longer period of time than the sixth signal. For example, whereas the sixth signal accumulates a count for a period of one hour in some embodiments, the seventh signal accumulates the count for a period of one, two, or three days, or even longer.

An eighth signal in some embodiments is a cumulative failed and successful sign in rate per username per time period t. In some embodiments, this eighth signal is generated per device and per each username used in an attempted login. Thus, in some embodiments let $y_T = (y_{T,fail}, y_{T,success})$ be the bivariate cumulative number of failed and successful login cumulated across each time window up to T, across all devices in network. Let $U_T$ be the count of distinct username on a device where $y_{T,success} = 0$, that is, the user has never successfully authenticated to any device in the network. Thus, in some embodiments, the eighth signal represents a time series of a cumulative count of usernames attempting to login to a device but never successfully doing so. This eighth signal is generated, in at least some embodiments, A ninth signal in some embodiments is a username last time successful sign in per device per T. Per each device and per each username, let $y_T = (T_1, \ldots, T_k)$ be the k most recent distinct times with at least one successful login. If this does not exist this time series is set to empty.

A tenth signal in some embodiments characterizes IP address abuse per T. Per each IP address, if available, let $y_{T-d}$ be the reputation score of the IP address associated with suspicious activity (brute force, scanning, etc.) over the time period T and last d-days. Otherwise, $y_{T-d}$ is a multivariate time series consisting of the following:

Region associated with source IP address. Some embodiments assign a reputation score to geographic regions. A reputation of a source IP address is determined, in some embodiments, based at least in part on a reputation associated with a region of origin. In these embodiments, a second component of the reputation is based on the source IP address itself. The region of a source IP address is weighted more heavily, in some embodiments, if a history associated with the source IP address is less robust. In other words, if reputation information associated with the source IP address meets a first criterion, a first weight is assigned to a reputation of the source IP address region, and a second weight is assigned to the reputation of the source IP address itself. An overall reputation is then determined based on the first weight and second weight. If the source IP address reputation meets a second criterion, a third weight is assigned to the reputation of the source IP address region, and a fourth weight is assigned to the reputation of the source IP address itself. The third weight is lower than the first weight in some embodiments. The fourth weight is higher than the second weight in some embodiments.

A count of devices with multiple inbound RDP connections and failed logins.

A count of enterprises where at least one device had multiple inbound RDP connection and failed logins.

A count of distinct IP addresses that also occurred during an RDP connection with failed login over the time window on a given device For many cybersecurity problems, including detecting brute force attacks, previously labeled data is not usually available. Thus, training a supervised learning model is not feasible. This is where unsupervised learning is helpful, enabling one to discover and quantify unknown behaviors when examples are too sparse. Given that several of the signals we consider for modeling RDP brute force attacks are inherently dependent on values observed over time (for example, daily counts of failed logins and counts of inbound connections), time series models are particularly beneficial. Specifically, time series anomaly detection naturally provides a logical framework to quantify uncertainty in modeling temporal changes in data and produce probabilities that then can be ranked and compared to a predetermined threshold to control a desirable false positive rate.

Time series anomaly detection captures the temporal dynamics of signals and accurately quantifies the probability of observing values at any point in time under normal operating conditions. More formally, if we introduce the notation Y(t) to denote the signals taking on values at time t, then we build a model to compute reliable estimates of the probability of Y(t) exceeding observed values given all known and relevant information, represented by P[y(t)], sometimes called an anomaly score. Given a false positive tolerance rater (e.g., 0.1% or 1 out of 10K per time), for each time t, values y*(t) satisfying P[y*(t)]<r would be detected as anomalous. Assuming the right signals reflecting the relevant behaviors of the type of attacks are chosen, then the idea is simple in that the lowest anomaly scores occurring per time will be likely associated with the highest likelihood of real threats.

For example, with respect to FIG. 2B discussed above, the time series of daily count of failed login occurring on the brute force attack day Aug. 4, 2019 had extreme values that would be associated with an empirical probability of about 0.03% out of all machine and days with at least 1 failed network login for the enterprise.

As discussed earlier, applying anomaly detection to a single or a few signals to detect real attacks can yield too many false positives. To mitigate this, we combined anomaly scores across the eight signals we selected to model RDP brute force attack patterns. The details of our solution are included in the appendix, but in summary, our methodology involves:

1) updating statistical discrete time series models sequentially for each signal, capturing time of day, day of week, and both point and cumulative effects
2) combining anomaly scores using an approach that yields accurate probability estimates, and
3) ranking the top N anomalies per day to control a desired number of false positives. Our approach to time series anomaly detection is computationally efficient, automatically learns how to update probabilities and adapt to changes in data.

Figure 6:
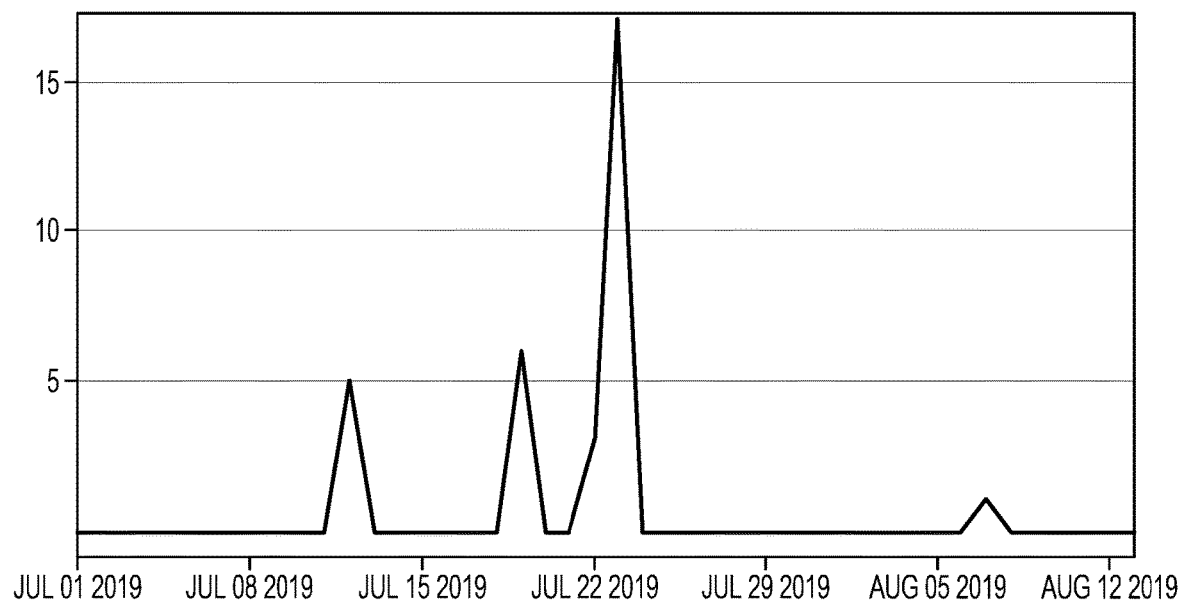
FIG. 6 shows an example daily count of network failed login for a machine with no brute force attack.

FIG. 6 shows a daily count of network failed login for a machine with no brute force attack. Parametric discrete location/scale distributions do not generate well-calibrated p-values for rare time series as seen in FIG. 6, and thus if used to detect anomalies can result in too many false positives when looking across many machines at high time frequencies. To overcome this challenge of sparse time series of counts of failed login attempts and RDP inbound public connections, some embodiments utilize a mixture model. In some of these embodiments, a zero-inflated two-component negative binomial distribution was utilized.

This formulation is based on thresholding values which are used to select a distribution to compare to the time series. An example of selecting a distribution is provided via Equation 1 below. The comparison of multiple distributions to a single time series based on threshold captures the multi-modal and heavy-tailed behavior of operational parameter values in a computationally efficient way. This represents an improvement over other approaches such as those that utilize expectation maximization.

In some embodiments, hierarchical priors are given from empirical estimates of the sample moments across machines using about one month of data.

Equation 1: Zero-Adjusted Negative Binomial Threshold Model

Let $y_t$ be a univariate time series corresponding to one of the signals of brute force.

Density:

$$ZANBT[y_t \mid \pi_t, \lambda_t, \tau_t] := \begin{cases} \pi_t & \text{if } y_t = 0; \\ (1-\pi_t)P(C_t = 0)NB(y_t \mid \lambda_t, v_t) & \text{if } 0 < y_t \leq \tau_t; \\ (1-\pi_t)P(C_t = 1)NB(y_t \mid \tau_t, v_t) \end{cases}$$

Hierarchail Priors:

$$BE(\pi_t \mid a_t, b_t) \propto \pi_t^{a_t-1}(1-\pi_t^{b_t-1});$$

$$GA(\lambda_t \mid \alpha_t, \beta_t) \propto \beta_t^{\alpha_t}\lambda_t^{\alpha_t-1}\exp[-\beta_t\lambda_t];$$

$$\tau_t = E[Y_t \mid Y_t > qNB(Q, \lambda_t, v_t)];$$

$$P(C_t) = \text{count}[Y_t >= \tau_t]/\text{count}(Y_t);$$

Negative Binomial Distribution (NB):

Given estimates $\mu = \text{mean}(y)$, and $\sigma = \text{standard deviation}(y)$.

Compute scale $s = (\sigma^{\wedge}2 - \mu)/(\mu^{\wedge}2)$.

$$PDF: P(Y = y \mid \mu, s) = \Gamma(y+1/s)/\Gamma(1/s)$$

$$\Gamma(y+1)((s*\mu)/(1+s*\mu))^{\wedge}y(1/(1+s*\mu))^{\wedge}\{1/s\}$$

where $\Gamma(y) := \int_0^\infty u^{y-1}e^{-y}$ is the Gamma function[4]

This formulation does not yield a conjugate prior, and thus directly computing probabilities from the posterior predicted density is not done. Instead, anomaly scores are generated based on drawing samples from distributions and then computing the empirical right-tail p-value.

Updating parameters is done based on applying exponential smoothing, a sequential and computationally efficient method capable of weighting more recent data. To avoid skewing of estimates based on outlier data, such as machines under brute force or other attacks, trimming is applied to sample from the distribution at a specified false positive rate, (e.g. 0.1%). Algorithm 1 below demonstrates this.

The smoothing parameters were learned based on maximum likelihood estimation and then fixed during each new sequential update. To induce further uncertainty, bootstrapping across machines is done to produce a histogram of smoothing weights, and samples are drawn in accordance to their frequency. We found that weights concentrated away from 0 vary between 0.06% to 8% for over 90% of machines, thus leading to slow changes in the parameters. An extension using adaptive forgetting factors will be considered in future work to automatically learn how to correct smoothing real time.

To update model parameters, some embodiments utilize algorithm 1, discussed below. In algorithm 1, for each model parameter $\theta_t$, distribution of smoothing parameters $\alpha_\theta$, and new value $y_{t+\in}$, the following steps are performed:

1) Apply an appropriate link function $g_\theta$ to produce a continuous unbounded variable $\eta_t = g_\theta[\theta_t]$;
2) Sample a smoothing weight $\tilde{\alpha}_\theta \sim \alpha_\theta$;
3) Update additive parameter using exponential smoothing: $\eta_{t+\in} = \tilde{\alpha}_\theta * g_\theta[y_{t+\in}] + (1-\tilde{\alpha}_\theta)*\eta_t$;
4) Update parameter $\theta_{t+\in} = g_\theta^{-1}[\eta_{t+\in}]$.

FIG. 7 shows example ranking of detected RDP inbound brute force attacks. For each machine detected with a probable brute force attack, each instance is assigned TP, FP, or unknown, and each TP is assigned priority based on the severity of the attack. For high-priority TP, a targeted attack notification is sent, in some embodiments, to the associated enterprise with details and recommendations regarding the active brute force attack; otherwise the machine is closely monitored until more information is available.

Some of the disclosed anomaly detection embodiments provide extra capability of sending targeted attack notifications to organizations when attacks are detected. In many cases, these notifications are provided before the brute force attack succeeds or the actor was able to conduct further malicious behavior. Experimental results indicate that the average precision per day, that is, true positive rate, was approximately 93.7% at a conservative false positive rate of 1%.

Via selection of signals found to be highly associated with RDP brute force attacks, time series anomaly detection is very accurate in identifying real threats. Monitoring suspicious activity in failed login and network connections should be taken seriously, and real time anomaly detection capable of self-updating with the changing dynamics in a network can indeed provide a sustainable solution.

Some embodiments employ hierarchical zero adjusted negative binomial dynamic threshold models to capture the characteristics of the highly discrete count time series. Specifically, as shown in FIG. 2B, many examples of brute force attacks do not demonstrate failed logins for valid credentials on a local machine, and hence, there are excess zeros that would not be explained by standard probability distributions such as the negative binomial. Also, the variance of non-zero counts can be much larger than the mean, where for example, valid scripts connecting via RDP can generate counts in the twenties or more over several minutes because of an outdated password. Moreover, given a combination of multiple users or scripts connecting to shared machines at the same time, this can generate more extreme counts at higher quantiles resulting in heavier tails as seen in FIG. 6.

Figure 8:
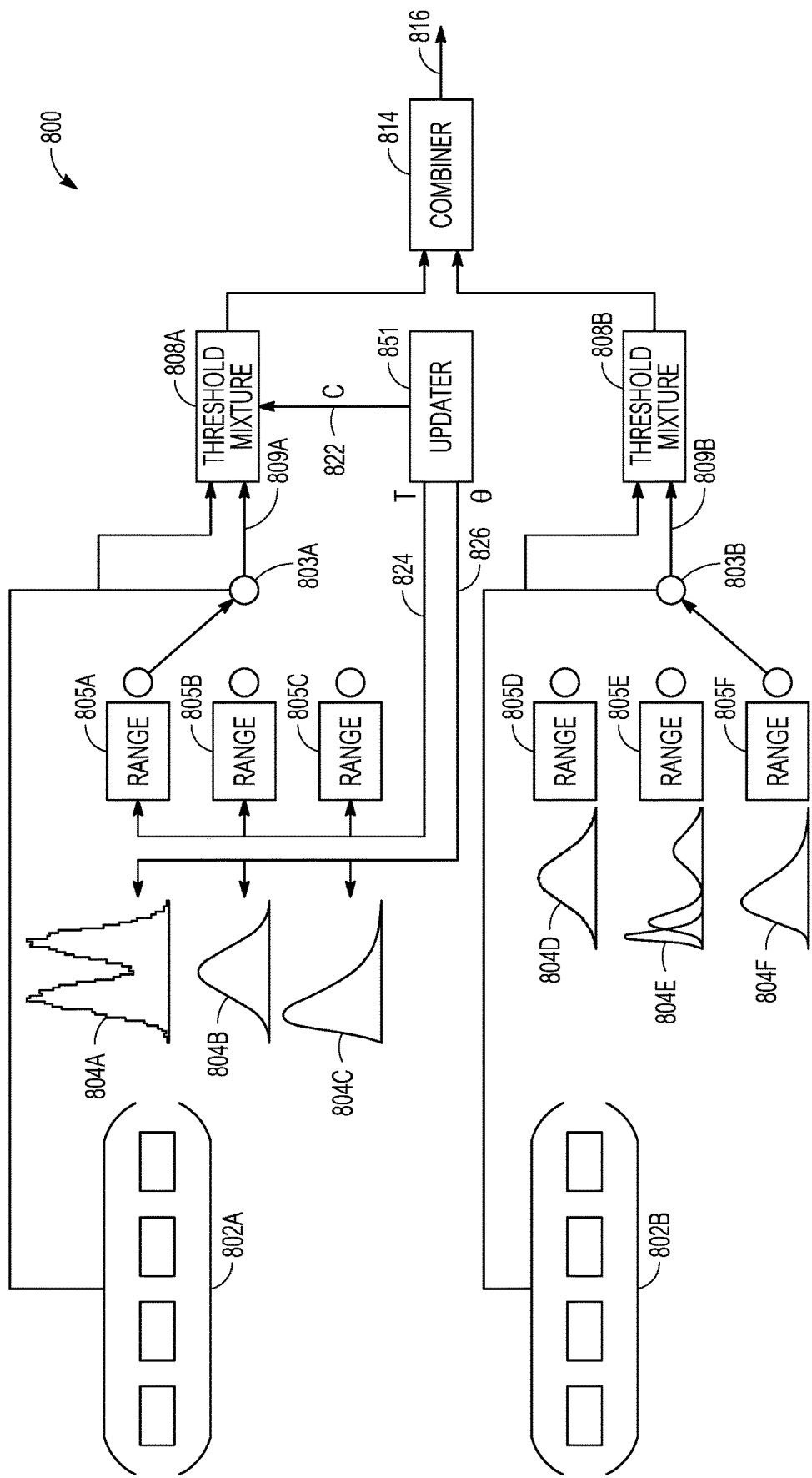
FIG. 8 is an example data flow diagram of one or more of the disclosed embodiments.

FIG. 8 is a diagram showing data flow occurring in one or more of the disclosed embodiments. Data flow 800 of FIG. 8 shows operation of two separate mixture models operating on two separate time series 802A and 802B. Each model includes a plurality to distributions (e.g. 804A-C in mixture model 1, and 804D-F in mixture model 2). Each mixture model also threshold values defining which of the plurality of distributions is applied to time series values (shown as value ranges 805A-C and ranges 805D-F). Each mixture model also includes a threshold mixture component which compares current time series values to the selected distribution. Each of the mixture models generates an indication of anomaly, shown in FIG. 8 as 812A and 812B. These indications of anomaly are then combined, by a combiner 814 to generate a single indication of anomaly or anomaly score 816.

In particular, data flow 800 includes a plurality of time series 802A and 802B. Each of the time series 802A and 802B indicates operational parameter values. Each of the time series 802A and 802B is provided to a selection component 803A and 803B respectively. The selection components 803A-B select between a plurality of distributions based on operational parameter values of the respective time series and a range associated with each distribution in the plurality of distributions. For example, FIG. 8 shows value ranges 805A-C associated with distributions 804A-C respectively. FIG. 8 also shows ranges 805d-f associated with distributions 804d-f respectively. The selection component 803A selects one of distributions 804A-C for time series 802A based on value ranges 805A-C. Selection component 803B selects one of distributions 804D-F for time series 802B based on ranges 805D-F. The value ranges 805A-C and 805D-F are dynamically updated by some embodiments of this disclosure. For example, some embodiments update the value ranges 805A-C and 805D-F based on values of the time series 802A and 802B respectively. This dynamic update process is discussed further below.

The selected distribution (809A for time series 802A, and distribution 809B for time series 802B) is provided to a respective threshold mixture model 808A-B. Each distribution P[Y|Θ] is modeled, in some embodiments, as a finite mixture of distributions. The distributions of the mixture are obtained from a list of distributions $P_1[Y|Θ_1], \ldots Pm[Y|Θ_m]$, where each parameter $Θ_p$ is a stochastic process.

Each threshold mixture model 808A-B compares the respective time series to its selected distribution (809A for time series 802A and selected distribution 809B for time series 802B), and outputs an indication of anomaly, shown as 812A-B respectively. The indications of anomaly 812A-B are combined by a combiner 814 into a single indication of anomaly or anomaly score 816. In some embodiments, the combiner 814 employs Fisher's method, as discussed further below, to combine the indications of anomaly 812A-B. In some embodiments, the single indication of anomaly or anomaly score 816 indicates whether a network is experiencing a brute force attack.

While FIG. 8 shows two time series, two sets of distributions (e.g. 804A-C and 804D-F), two selectors (803A-B), and two threshold mixture models (e.g. 808a-b), some of the disclosed embodiments rely on more than two of each of these components. For example, as discussed above, any number of time series (e.g. input signals), such as three (3), four (4), five (5), ten (10), fifteen (15), twenty (20) or any number may be processed, compared, and combined (e.g. via the combiner 814) in the contemplated embodiments.

FIG. 8 shows two groups of distributions as 804A-C and 804D-F. FIG. 8 demonstrates a selection of one of distributions 804A-C to compare to time series 802A, and a second selection of one of distributions 804D-F to compare to time series 802B. In some embodiments, the two groups of distributions 804A-C and 804D-F are equivalent. In some embodiments, the two groups of distributions 804A-C and 804D-F overlap. In some embodiments, the two groups of distributions 804A-C and 804D-F overlap, but are not equivalent. This can also be the case for larger than two groups of distributions, such as three (3), four (4), five (5), ten (10), twenty (20), or any number of distribution groups.

FIG. 8 also shows an updater 851. The updater 851 monitors operational parameter values in one or more of the time series 802A or the time series 802B (this is not shown in FIG. 8). As illustrated, the updater 851 is shown dynamically updating the mixture model for the time series 802A based on the monitored operational parameter values. In particular, the updater 851 is shown generating new parameter values Θ for each of the distributions 804A-C included in a particular mixture model. These parameter values are represented in FIG. 8 as data 826 via the symbol Θ. The updater 851 also updates threshold values that define boundaries between distributions of the mixture model. For example, the threshold values define boundaries between distributions 804A-C. These boundaries are represented in FIG. 8 by the different value ranges 805A-C. FIG. 8 shows updated values for τ via data flow 824 defining the value ranges 805A-C. The updater 851 also updates two-state homogenous hidden Markov models represented by the symbol "C" in FIG. 8, via data flow 822. While FIG. 8 shows the updater 851 being applied only to the top mixture model that is processing time series 802A, in at least some embodiments, the updater is similarly applied to two or more mixture models utilized to detect a brute force attack. For example, the updater 851 could also be applied to update the second mixture model that processes the time series 802B, however, this has been omitted from FIG. 8 to preserve figure clarity. Specific methods utilized by the updater 851 are discussed in more detail below.

Figure 9:
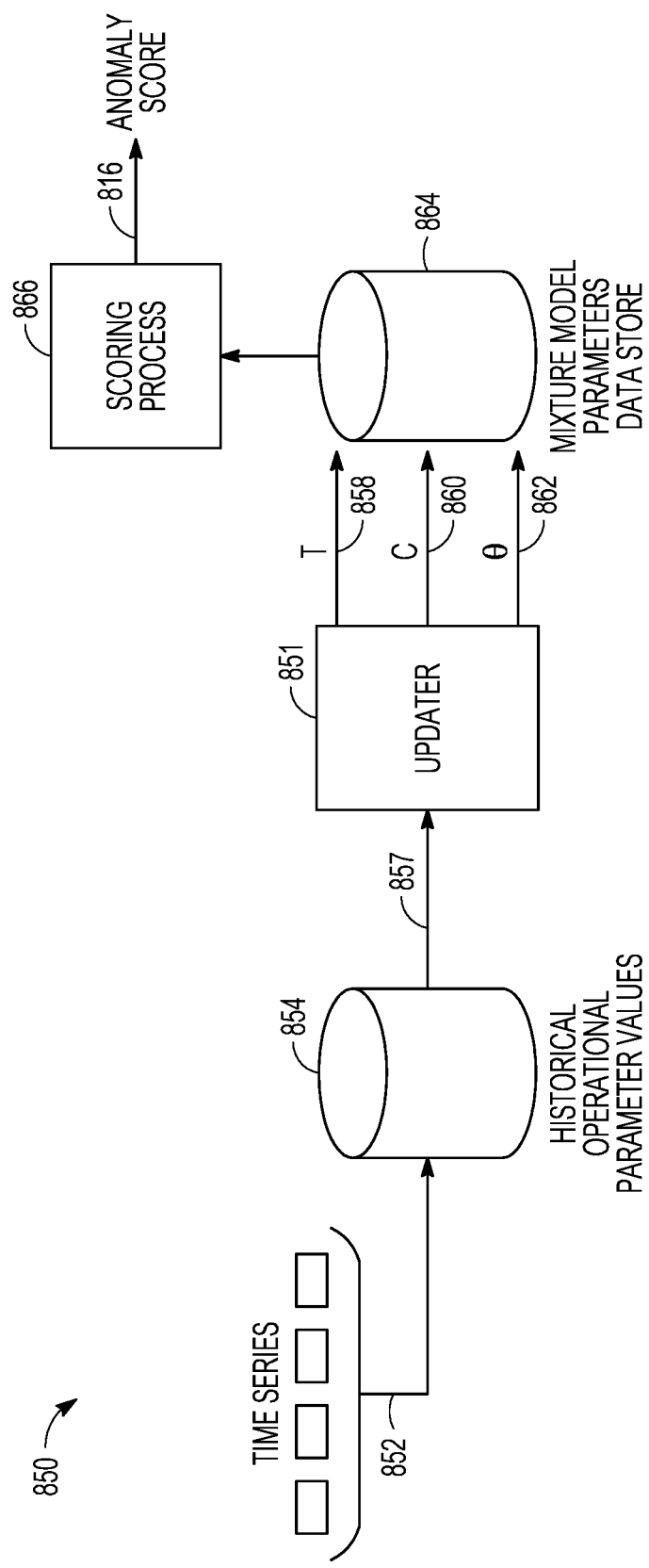
FIG. 9 is an example data flow diagram of one or more of the disclosed embodiments.

FIG. 9 shows an example data flow implemented in one or more of the disclosed embodiments. The data flow 850 of FIG. 9 illustrates how the updater 851 processes data in one or more of the disclosed embodiments. FIG. 9 shows a time series of operational parameter values 852 flowing into a historical database 854. Historical time series data 857 is then provided to the updater 851. Based on the historical time series data, the updater generates data values 858 (τ), 860 (C), and 862 (Θ). Data value 862 is a parameter at least partially defining a distribution of the historical time series data 857. In some embodiments, multiple parameter values are generated. Data value 860 is two state homogenous hidden Markov model, defined by a probability that the time series data (e.g. 857) is greater than the value T of data value 858. Referring back to FIG. 8, data values 858, 860, and 862 generated by the updater 851 are shown flowing to control the value ranges 805A-C, the distribution 804A-C, and the threshold mixture models 808A-C.

FIG. 9 shows the T values in data value 858, two state markov model values in data value 860, and parameter values in data value 862 being stored in a mixture model parameters data store 864. The mixture model parameters data store 864 is referenced, in some embodiments, by a scoring process 866. The scoring process 866 implements at least portions of data flow 800, discussed above with respect to FIG. 8.

The updater 851 operates, in at least some embodiments, on multiple time series obtained by the disclosed embodiments and multiple corresponding mixture models. One implementation of the updater 851 is discussed below with respect to FIG. 11.

Figure 10:
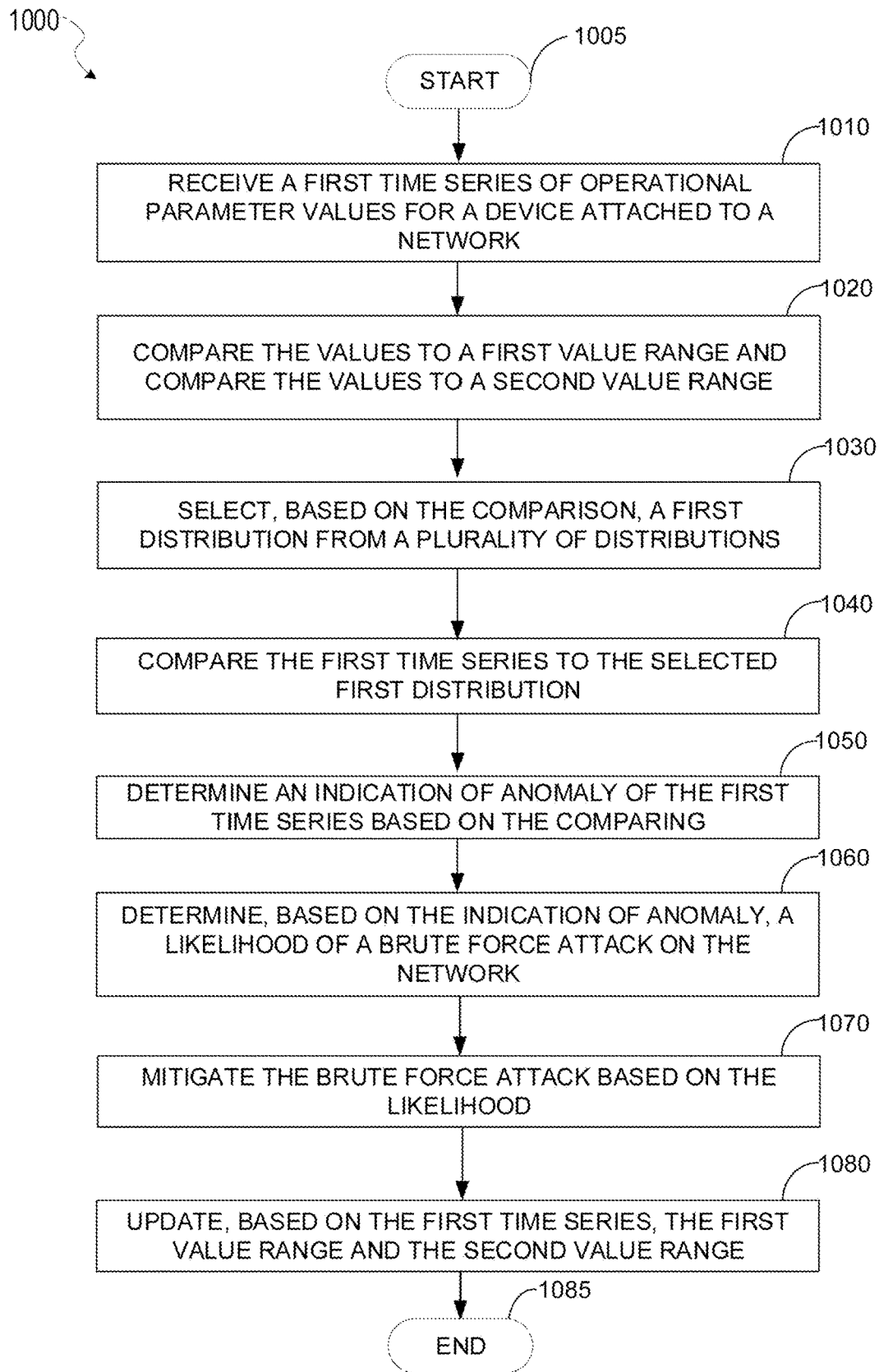
FIG. 10 is a flowchart of an example method for determining whether a network is experiencing a brute force attack.

FIG. 10 is a flowchart of a process for determining whether a network is experiencing a brute force attack. In some embodiments, one or more of the functions discussed below with respect to FIG. 10 are performed by hardware processing circuitry (e.g. 1202). In some embodiments, instructions (e.g. 1224) stored in a memory (e.g. 1204, 1206) configure the hardware processing circuitry to perform one or more of the functions discussed below. In some embodiments, process 1000 discussed below is performed by a network management system or a network security system (e.g. 110).

After start operation 1005, process 1000 moves to operation 1010, where a first time series of operational parameter values are received. The first time series of operational parameter values relate to operation of a device attached to a network. For example, as discussed above with respect to FIG. 1, operations parameter values of one or more of the network components 102A-F are provided to the network security system 110. In some embodiments, operation 1010 includes receiving one or more messages indicating the operational parameter values (e.g. any one or more of messages 122A-C). In various embodiments, multiple different time series of different operational parameter values are received. The multiple different time series are received from a single device and/or multiple devices in some embodiments. For example, as discussed above, one or more network component devices provide or transmit time series indicating operational parameter values to a network management system or network security system (e.g. 110). The received time series of operational parameter values indicate one or more of failed login and RDP connections per hour of day and day of week, time delays between one or more failed login and a successful logon, logon type (e.g. Event ID 4625), failure reason (e.g. Event ID 4625), cumulative count of each distinct username that failed to login without success, a count (and cumulative count) of failed logins, a count (and cumulative count) of RDP external IP addresses (e.g. for inbound RDP connections). These time series of operational parameter values are discussed in more detail above.

In operation 1020, the operational parameter values in the first time series are compared to a first parameter value range and a second parameter value range. For example, as discussed above, some of the disclosed embodiments employ a multi-modal distribution (mixture model) approach to analyzing operational parameter values.

For example, a plurality of time series of operational parameter values received in operation 1010 can be represented via $y_1 \ldots y_k$. Each time series is a subset of time series from the same given data generating process $P[y_i|\Theta_i]$, where each $P[.|\Theta_i]$ can be a different probability distribution family. Each distribution $P[Y|\Theta]$ is modeled as a finite mixture of distributions specified from a list of distributions $P_1[Y|\Theta_1], \ldots P_m[Y|\Theta_m]$, where each parameter $\Theta_p$ is a stochastic process.

Some of the disclosed embodiments utilize a switching mechanism that is based on learned threshold values of y exceeding specified quantiles. The quantiles are defined, in at least some embodiments, via Equation 1 below:

Let $q_p \in (0, 1)$ be a chosen $q^{th}$ quantile $Q_p$ of $P_p[Y|\Theta_p]$, and define $\tau_p := E[Y|Y>Q_{p-1}]$, such that $\tau_p > \tau_{p+1}$.

Let $C_p$ be a two-state homogenous hidden Markov model, defined by the probability that $Y >= \tau_p$.

The dynamic threshold mixture density is defined in some embodiments as follows:

$$P_{thesh}[Y|\Phi=(\Theta,\tau,C)] := P_1[Y|\Theta_1]*P[C_1] \text{ if } Y<=\tau_1;$$

$$P_2[Y|\Theta_2]*P[C_2] \text{ if } \tau_1<Y<=\tau_2; \ldots, P_m[Y|\Theta_m]*P[C_m] \text{ otherwise;} \quad (1)$$

Thus, in operation 1030, from a plurality of possible distributions to apply to the time series, one distribution is selected based on a parameter value range of the time series. The parameter value ranges for each of the possible distributions is dynamically adjusted in some embodiments as discussed further below (e.g. with respect to FIG. 11). Thus, in operation 1030, a first distribution from the plurality of possible distributions is selected based on the comparisons. For example, if the time series values are generally within the first parameter value range, a first distribution is selected, whereas if the time series values are generally within the second parameter value range, a second distribution is selected, at least in some embodiments. If the first distribution is selected, the selected first distribution is the used to determine whether the time series represents anomalous activity, or a degree of anomalous activity present in the time series.

In some embodiments, time series values are generally within the first parameter value range if the values fall within the first parameter value range after outliers or exceptional values are eliminated or not considered. For example, some embodiments may determine a percentage of time series values that fall within each of the possible parameter value ranges, with a range including the highest percentage of values used in selecting an appropriate distribution.

In operation 1040, the first time series is compared to the selected distribution. For example, in some embodiments, a percentage of operational parameter values that conform with the selected distribution is determined. In embodiments that process a plurality of time series, values of each time series are compared to a corresponding distribution selected based on the respective time series (e.g. selected distribution 809A is compared to time series 802A and selected distribution 809B is compared to time series 802B in FIG. 8).

As discussed above, process 1000 compares values of one or more time series (e.g. time series 802A and time series 802B) to a corresponding set of parameter value ranges (e.g. value ranges 805A-C and value ranges 805D-F respectively), or a first parameter value range and second parameter value range for that particular time series. Distributions specific for each time series are then selected based on which range the values of the respective time series fall (e.g., as illustrated in FIG. 8, a plurality of distributions 804A-C are considered for selection based on corresponding value ranges 805A-C and values of the time series 802A).

In operation 1050, an indication of anomaly is determined based on the comparison of the first time series with the selected distribution (e.g., as performed when the threshold mixture model 808A compares time series 802A to selected distribution 809A). Some embodiments determine a percentage of operational parameter values of the first time series that fall outside the selected distribution. The percentage is the indication of anomaly. In other embodiments, a probability of occurrence of each value in the time series is determined based on the selected distribution. These probabilities are then aggregated to determine the indication of anomaly. In some embodiments, the aggregation is performed by multiplying the probability of occurrence of each of the values. The resulting aggregated probability is then normalized in some embodiments.

Note that some embodiments of process 1000 operate on multiple different time series of operational parameter values, and multiple mixture models. For example, as described above with respect to FIG. 8, some embodiments combine a plurality of anomaly indications (e.g. 812A and 812B) generated by a corresponding plurality of mixture models via a combination process (e.g. combiner 814) to generate a combined indicator of anomaly, or in other words, a single indication of anomaly or anomaly score (e.g. 816). Some embodiments utilize Fisher's method to combine the plurality of indications of anomaly into a single anomaly indication. For example, some embodiments operate as follows: Let $\alpha_{T,1}, \ldots, \alpha_{T,N}$ be the collection of available scores. These embodiments then compute $\chi_T = -2 \Sigma_{i=1}^{i=N} \log [\alpha_{T,i}]$, where $\chi_T$ is the combined indicator of anomaly for purposes of the discussion of process 1000. Fisher showed that if each $\alpha_{T,i}$ is independent with a uniform distribution between 0 and 1, then $\chi_T$ would have a chi-square distribution with 2N degrees of freedom. The use of Fisher's test applied to anomaly scores produces a scalable solution that yields interpretable probabilities that thus can be controlled to achieve a desired false positive rate.

In operation 1060, based on the indication of anomaly, a likelihood of a brute force attack on the network is determined. For example, in some embodiments, if the indication of anomaly is above a predetermined threshold, process 1000 determines that the network is experiencing a brute force attack. Some embodiments maintain a moving average of indications of anomaly, and determine the network is experiencing a brute force attack if the moving average of anomaly indications transgresses a predetermined threshold.

Upon determination that a brute force attack is likely occurring, additional forensics processing is performed in some embodiments to identify one or more offending computers that are performing the brute force attack. These identified computers are located outside the network (e.g. external devices 104A-C), or in some embodiments, may be internal to the network (e.g. in some cases, malware installed on a computer within the network may provide a "proxy" for a malicious actor to perform a brute force attack on the network).

In operation 1070, the brute force attack is mitigated based on the likelihood. Some embodiments mitigate a brute force attack by determining a mitigation action based on the likelihood. A mitigating action can include controlling network access in some embodiments. For example, in some embodiments, if the likelihood is higher than a predetermined threshold, one or more access control policies of a firewall (e.g. firewall 108) or multiple firewalls controlling access to a network (e.g. 101) may be adjusted. For example, more restrictive firewall polices may be applied during a brute force attack (e.g. initiated by the network security system 110). In some embodiments, packets received from devices identified as participating in the brute force attack (e.g. any one or more of external devices 104A-C) are dropped at an access point to the network (e.g. one or more firewalls, such as firewall 108). This is accomplished in some embodiments, by modifying access policies of the firewalls to restrict access to the network by the identified devices. In some embodiments, one or more alerts are generated based on the likelihood. The alerts may be generated, in various embodiments, via text, email, or other messaging technology.

In operation 1080, the first parameter value range and the second parameter value range (e.g. value range 805A and value range 805B) are updated based on the operational parameter values of the first time series (e.g. 802A). Updating the first parameter value range and the second parameter value range adjusts at least a boundary between the first parameter value range and second parameter value range. To the extent that a mixture model includes more than two distributions, multiple boundaries are adjusted in operation 1080.

For example, given samples y from $P[Y|\Phi]$ (e.g. the first time series), estimation of the parameters $\Phi$ proceeds in two stages, at least in some embodiments. In a first stage, parameters are initialized. In some embodiments, Gibbs sampling is used to initialize the parameters. This computes the conditional likelihood for each parameter under a specified choice of hierarchical priors. The first stage is performed before operation 1010 is performed in some embodiments. In a second stage, each parameter is updated using generalized exponential smoothing with a selected grid of smoothing weights $\alpha_\Phi$ for each parameter $\Phi$ with a link function $g_\Phi$. Thus, for each parameter $\Phi$, the link function $g_\Phi$ is applied to yield an additive term $\eta_t := g_\Phi[\Phi_t]$. A smoothing weight is then sampled $\tilde{\alpha}_\Phi \sim \alpha_\Phi$. The additive parameter is updated according to:

$$\eta_{t+\in} = \tilde{\alpha}_\Theta * M_\Phi[y_{t+\in}|\eta_t] + (1-\tilde{\alpha}_\Theta)*\eta_t$$

where $M_\Phi$ is the central moment corresponding to the parameter $\Phi$.

In some embodiments, the updated parameter is set to, $\Phi_{t+\in} = g_\Phi^{-1}[\eta_{t+\in}]$. After the parameters of the distribution are updated, an updated posterior distribution $\Phi_{t+1}$, and for each new sample $y_{t+1}$, a right tail pvalue is computed. In some embodiments, the right tail pvalue is computed according to:

$$\Pi_{t+1} := \text{Prob}_{thresh}[Y > y_{t+1}|\Phi_{t+1}] = \int_{Y > y_{t+1}}^{\infty} P_{thesh}[Y]d\mu$$

where:
$\Pi_{t+1}$ is the right tail pvalue for the updated distribution,
$\mu$ is a probability measure; for discrete data, this is the counting measure, else it is the Lebesgue measure,
$\Phi_{t+1}$ is an updated posterior distribution,
$y_{t+1}$ is a new sample value,
$P_{thresh}$ is a dynamic threshold mixture density. In some embodiments, $P_{thres}$ is defined as $$P_{thesh}[Y|\Phi=(\Theta,\tau,C)] := P_1[Y|\Theta_1]*P[C_1] \text{ if } Y<=\tau_1;$$

$$P_2[Y|\Theta_2]*P[C_2] \text{ if } \tau_1 < Y <= \tau_2;$$

$$\ldots, P_m[Y|\Theta_m]*P[C_m] \text{ otherwise};$$

where:
Cp is a two-state homogenous hidden Markov model, defined by the probability that $Y >= \tau_p$,
$\tau_p := E[Y|Y > Q_{p-1}]$, such that $\tau_p, > \tau_{p+1}$.
$q_p \in (0,1)$, and $q_p$ is a qth quantile $Q_p$ of $P_p[Y|\Theta_p]$,
$E[\ ]$ is an expected value function.

One embodiment of operation 1080 is described below with respect to FIG. 11. After process 1000 completes, process 1000 moves to end operation 1085.

Figure 11:
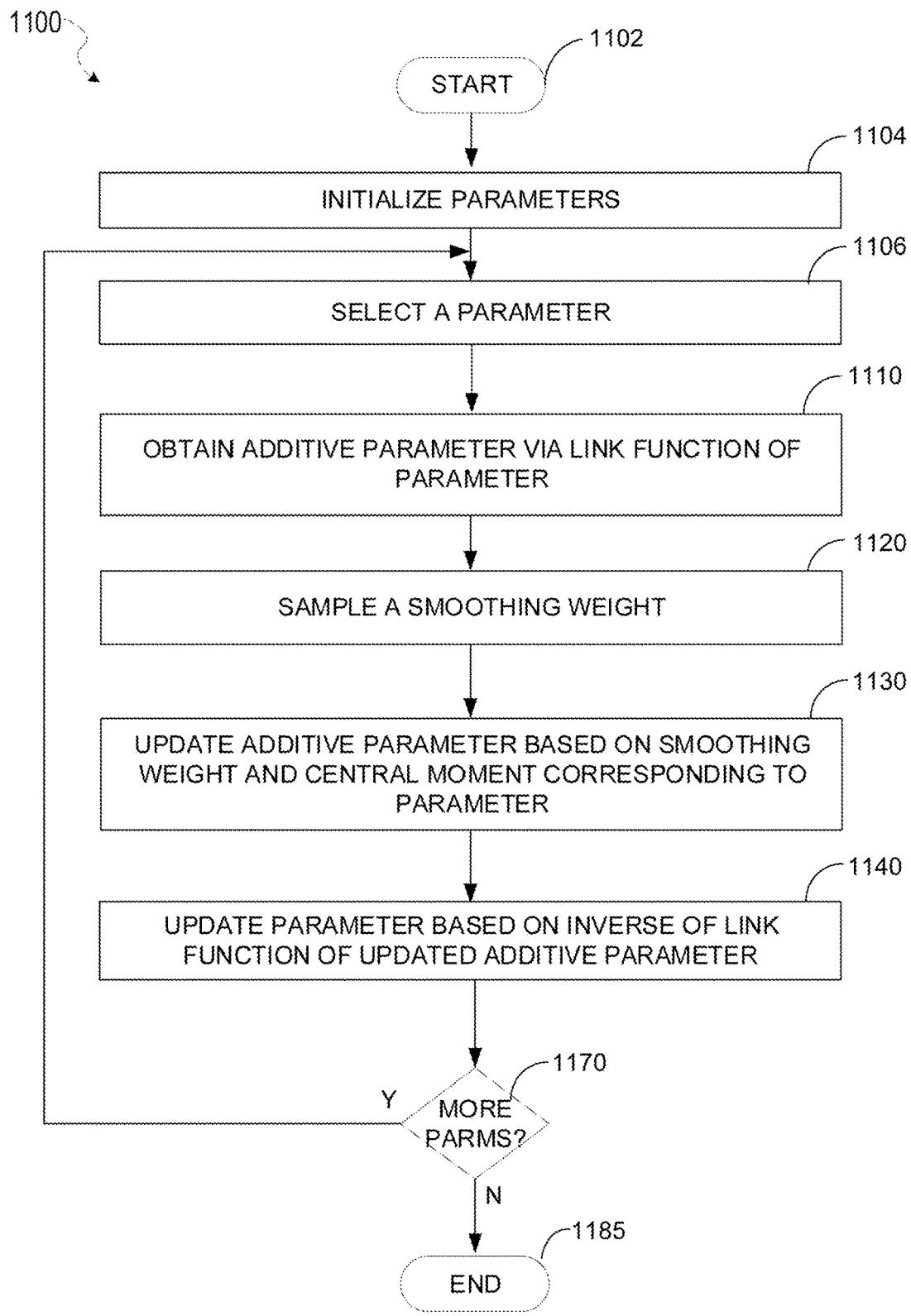
FIG. 11 is a flowchart of an example process for estimating parameters of an unknown distribution.

FIG. 11 is a flowchart of a process for estimating parameters of an unknown distribution. In some embodiments of the present disclosure, the unknown distribution is a distribution of events occurring on a monitored network. This unknown distribution is dynamically estimated by estimating parameters of the distribution. Based on this estimation process, the disclosed embodiments are able to determine a probability of individual events occurring within the distribution. A brute force attack is then determined, in at least some embodiments, based on the determined probability.

The unknown distribution is described by a plurality of parameters. Each parameter describes a characteristic of the unknown distribution. For example, the plurality of parameters describe, in various embodiments, two or more of a standard deviation, mean, median of the distribution. In at least some embodiments, the distribution is modeled as a finite mixture of distributions specified from among a list of distributions $P_1[Y|\Theta_1], \ldots, P_m[Y|\Theta_m]$, where each parameter $\Theta$p is a stochastic process.

Process 1100 discussed below with respect to FIG. 11 determines updated distribution parameters, including ranges for selecting a distribution as discussed above. In some embodiments, process 1100 discussed below is performed by the updater 851 discussed above with respect to FIG. 9.

In some embodiments, process 1100 is performed for multiple time series obtained by the disclosed embodiments. For example, with respect to FIG. 8 discussed above, process 1100 is performed, in some embodiments, to estimate parameters of distributions for time series 802A, and separately performed to estimate parameters of distributions for time series 802B. A collection of time series is denoted as $Y_1, \ldots, Y_k$. Thus, each $Y_i = \{y_{ij} | j=1 \ldots n_i\}$ is a subset of time series from a given data generating process $P[Y_i | \Theta_i]$, where each $P[. | \Theta_i]$ can be a different probability distribution family.

In some embodiments, one or more of the functions discussed below with respect to FIG. 11 are performed by hardware processing circuitry (e.g. 1202). In some embodiments, instructions (e.g. 1224) stored in a memory (e.g. 1204, 1206) configure the hardware processing circuitry to perform one or more of the functions discussed below. In some embodiments, process 1100 discussed below is performed by a network management system or a network security system (e.g. 110). In some embodiments, one or more of the functions discussed below with respect to FIG. 11 are performed as part of operation 1080, discussed above with respect to FIG. 10.

After start operation 1102, process 1100 moves to operation 1104, which initializes parameters of the distribution. In some embodiments, the parameters are estimated using Gibbs sampling. For example, some embodiments compute a conditional likelihood for each parameter under a selected set of hierarchical priors for the parameter. The parameter is then initialized based on the conditional likelihood.

In operation 1106, a parameter of the plurality of parameters is selected. In operation 1110, an additive parameter corresponding to the selected parameter is obtained via a link function. For example, in some embodiments, the additive parameter $\eta_t$ is obtained via:

$$\eta_t := -g_\Phi[\Phi_t]$$

where:
$g_\Phi$ is a link function of parameter $\Phi$.

In operation 1120, a smoothing weight is sampled. In operation 1130, the additive parameter is updated based on the smoothing weight and a central moment corresponding to the parameter. For example, in some embodiments, the additive parameter $\eta_t$ is updated via:

$$\eta_{t+\in} = \tilde{\alpha}_\theta * M_\Phi[y_{t+\in}|\eta_t] + (1-\tilde{\alpha}_\theta) * \eta_t$$

where:
$\tilde{\alpha}_\theta$ is the smoothing weight,
$y_{t+\in}$ is the time series at time $t+\in$, and
$M_\Phi$ is a central moment corresponding to the parameter $\Phi$.

In operation 1140, the selected parameter is updated based on an inverse link function of the updated additive parameter. In some embodiments, the selected parameter is updated according to:

$$\Phi_{t+\in} = g_\Phi^{-1}[\eta_{t+\in}]$$

where:
$\Phi_{t+\in}$ is the updated parameter,
$g_\Phi^{-1}$ is the inverse of the link function, and
$\eta_{t+\in}$ is the updated additive parameter.

Operation 1170 determines if there are additional parameters of the distribution. If so, processing returns to operation 1106. Otherwise, processing moves to end block 1185.

Note that at least some embodiments of FIG. 11 function to define or otherwise update values ranges used to select a distribution in a multi-modal model. For example, as discussed above, boundaries delineating a first parameter value range and a second parameter value range are adjusted in some embodiments of process 1100 based on values of a time series. A likelihood of a brute force attack is then determined based on the adjusted boundary. As illustrated above with respect to FIG. 8, adjusting the boundary between value ranges controls which distribution is compared to the time series at any particular time. The comparison of the time series with the distribution determines how likely the values included in the time series occur within the selected distribution. This likelihood may be combined, in some embodiments, with other likelihoods of values from other time series (e.g. combined via Fisher's method).

Figure 12:
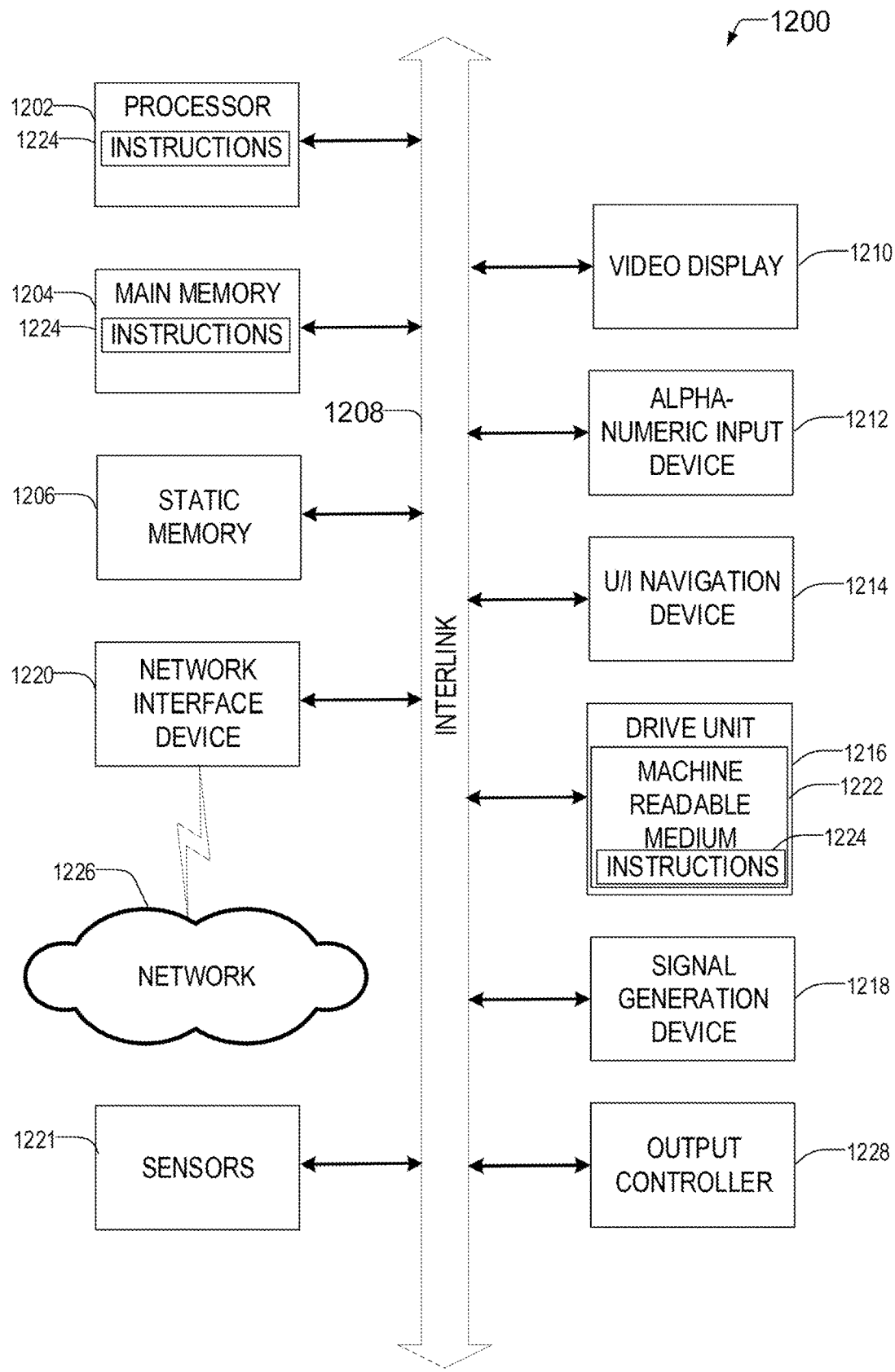
FIG. 12 illustrates a block diagram of an example machine 900 upon which any one or more of the techniques (e.g., methodologies) discussed herein may perform.

FIG. 12 illustrates a block diagram of an example machine 1200 upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 1200 may perform one or more of the processes described above with respect to FIGS. 1-11 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or another sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1224 may further be transmitted or received over a communications network 1226 using a transmission medium via the network interface device 1220. The machine 1200 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques.

Example 1 is a method performed by hardware processing circuitry, comprising: obtaining a first time series of operational parameter values of a device attached to a network; comparing the values of the first time series to a first parameter value range and a second parameter value range; determining, based on the comparing, that the values of the first time series are within the first parameter value range; based on the determining, selecting, from a plurality of distributions, a first distribution; comparing the first time series to the selected first distribution; determining, based on the comparing, a first probability at which values in the first time series occur in the selected distribution; determining, based on the first probability, a likelihood of a brute force attack on the network; based on the first time series, adjusting a boundary between the first parameter value range and the second parameter value range; and determining, based on the adjusted boundary, a second likelihood of a brute force attack.

In Example 2, the subject matter of Example 1 optionally includes performing, based on the likelihood, a mitigating action.

In Example 3, the subject matter of Example 2 optionally includes wherein the mitigating action includes changing an access control policy of the network.

In Example 4, the subject matter of Example 3 optionally includes wherein the changing of the access control policy comprises programmatically configuring a firewall of the network.

In Example 5, the subject matter of any one or more of Examples 1-4 optionally include wherein the adjusting of the boundary comprises updating a threshold value $\tau\_p$ defining the boundary between the first range and the second range, $\tau\_p$ defined according to: $\tau\_p := E[Y|Y > Q\_{(p-1)}]$ where: $E[\ ]$ is an expected value function, Y is the first time series, tp is a threshold value between the first range and the second range, Qp is a qth quantile of a negative binomial distribution.

In Example 6, the subject matter of any one or more of Examples 1-5 optionally include wherein the adjusting of the boundary further comprises updating parameters defining the first and second distributions based on the first time series.

In Example 7, the subject matter of any one or more of Examples 1-6 optionally include wherein the parameters are updated via exponential smoothing and a grid of smoothing weights.

In Example 8, the subject matter of Example 7 optionally includes where at least one parameter of the distribution is updated according to: $\Phi_{t+\epsilon}=g\Phi-1[\eta_{t+\epsilon}]$, where: $\Phi_{t+\epsilon}$ is the updated parameter, $g\Phi$ is a link function for a parameter $\Phi$, $\eta\_(t+\epsilon)=\tilde{\alpha}\_\theta * M\_\Phi\ [y\_(t+\epsilon)|\eta\_t]+(1-\tilde{\alpha}\_\theta)*\eta\_t$, where: $M\_\Phi$ is a central moment corresponding to the parameter $\Phi$, $\tilde{\alpha}\_\theta$ is a smoothing weight, $\eta t$ is $g\Phi[\Phi t]$, $y\_(t+\epsilon)$ is a sample value included in the first time series.

In Example 9, the subject matter of Example undefined optionally includes, wherein the first distribution and the second distribution are included in the finite mixture of distributions.

In Example 10, the subject matter of any one or more of Examples 1-9 optionally include determining a second time series for second operational parameter values of the device; selecting, based on the second time series, a second distribution; second comparing the second time series to the selected second distribution; determining, based on the second comparing, a second probability at which second values in the second time series occur in the selected second distribution; applying Fisher's method to the first probability and the second probability; and based on the applying, generating a combined indicator of anomaly, wherein the determining of the likelihood of the brute force attack is further based on the combined indicator.

In Example 11, the subject matter of Example 10 optionally includes wherein the first time series indicates a cumulative number of logins over time that are successful, and the second time series indicates a cumulative number of logins over time that are unsuccessful.

In Example 12, the subject matter of Example 11 optionally includes generating a third time series indicating user account information associated with each of the logins indicated by the first and second time series, and second applying Fisher's method to the third time series, wherein the generating of the combined indicator is further based on the second applying.

In Example 13, the subject matter of any one or more of Examples 11-12 optionally include wherein the logins are remote desktop protocol (RDP) login attempts.

In Example 14, the subject matter of any one or more of Examples 1-13 optionally include wherein the first time series indicates one or more of hour of day and day of week of failed login and RDP connections, timing of successful logins following failed attempts, login type information, login failure reasons, a cumulative count of unique usernames that generated an unsuccessful login without a subsequent successful login, a count of failed login attempts, a count of RDP external IP addresses per device, and counts of two devices having RDP inbound connections from a common device.

Example 15 is a non-transitory computer readable medium comprising instructions that when executed configure hardware processing circuitry to perform operations comprising: obtaining a first time series of operational parameter values of a device attached to a network; comparing the values of the first time series to a first parameter value range and a second parameter value range; determining, based on the comparing, that the values of the first time series are within the first parameter value range; based on the determining, selecting, from a plurality of distributions, a first distribution; comparing the first time series to the selected first distribution; determining, based on the comparing, a first probability at which values in the first time series occur in the selected distribution; determining, based on the first probability, a likelihood of a brute force attack on the network; based on the first time series, adjusting a boundary between the first parameter value range and the second parameter value range; and determining, based on the adjusted boundary, a second likelihood of a brute force attack.

In Example 16, the subject matter of Example 15 optionally includes the operations further comprising performing, based on the likelihood, a mitigating action.

In Example 17, the subject matter of Example 16 optionally includes wherein the mitigating action includes changing an access control policy of the network.

In Example 18, the subject matter of Example 17 optionally includes wherein the changing of the access control policy comprises programmatically configuring a firewall of the network.

In Example 19, the subject matter of any one or more of Examples 15-18 optionally include wherein the adjusting of the boundary comprises updating a threshold value $\tau\_p$ defining the boundary between the first range and the second range, $\tau\_p$ defined according to: $\tau\_p:=E[Y|Y>Q\_(p-1)]$ where: $E[\ ]$ is an expected value function, Y is the first time series, tp is a threshold value between the first range and the second range, Qp is a qth quantile of a negative binomial distribution.

In Example 20, the subject matter of any one or more of Examples 15-19 optionally include wherein the adjusting of the boundary further comprises updating parameters defining the first and second distributions based on the first time series.

In Example 21, the subject matter of any one or more of Examples 15-20 optionally include wherein the parameters are updated via exponential smoothing and a grid of smoothing weights.

In Example 22, the subject matter of Example 21 optionally includes wherein at least one parameter of the distribution is updated according to: $\Phi_{t+\epsilon}=g\Phi-1[\eta_{t+\epsilon}]$, where: $\Phi_{t+\epsilon}$ is the updated parameter, $g\Phi$ is a link function for a parameter $\Phi$, $\eta\_(t+\epsilon)=\tilde{\alpha}\_\theta * M\_\Phi\ [y\_(t+\epsilon)|\eta\_t]+(1-\tilde{\alpha}\_\theta)*\eta\_t$, where: $M\_\Phi$ is a central moment corresponding to the parameter $\Phi$, $\tilde{\alpha}\_\theta$ is a smoothing weight, $\eta t$ is $g\Phi[\Phi t]$, $y\_(t+\epsilon)$ is a sample value included in the first time series.

In Example 23, the subject matter of Example undefined optionally includes, wherein the first distribution and the second distribution are included in the finite mixture of distributions.

In Example 24, the subject matter of any one or more of Examples 15-23 optionally include the operations further comprising: determining a second time series for second operational parameter values of the device; selecting, based on the second time series, a second distribution; second comparing the second time series to the selected second distribution; determining, based on the second comparing, a second probability at which second values in the second time series occur in the selected second distribution; applying Fisher's method to the first probability and the second probability; and based on the applying, generating a combined indicator of anomaly, wherein the determining of the likelihood of the brute force attack is further based on the combined indicator.

In Example 25, the subject matter of Example 24 optionally includes wherein the first time series indicates a cumulative number of logins over time that are successful, and the second time series indicates a cumulative number of logins over time that are unsuccessful.

In Example 26, the subject matter of Example 25 optionally includes the operations further comprising generating a third time series indicating user account information associated with each of the logins indicated by the first and second time series, and second applying Fisher's method to the third time series, wherein the generating of the combined indicator is further based on the second applying.

In Example 27, the subject matter of Example 26 optionally includes wherein the logins are remote desktop protocol (RDP) login attempts.

In Example 28, the subject matter of any one or more of Examples 15-27 optionally include wherein the first time series indicates one or more of hour of day and day of week of failed login and RDP connections, timing of successful logins following failed attempts, login type information, login failure reasons, a cumulative count of unique usernames that generated an unsuccessful login without a subsequent successful login, a count of failed login attempts, a count of RDP external IP addresses per device, and counts of two devices having RDP inbound connections from a common device.

Example 29 is a system, comprising: hardware processing circuitry; one or more hardware memories storing instructions that when executed configure the hardware processing circuitry to perform operations comprising: obtaining a first time series of operational parameter values of a device attached to a network; comparing the values of the first time series to a first parameter value range and a second parameter value range; determining, based on the comparing, that the values of the first time series are within the first parameter value range; based on the determining, selecting, from a plurality of distributions, a first distribution; comparing the first time series to the selected first distribution; determining, based on the comparing, a first probability at which values in the first time series occur in the selected distribution; determining, based on the first probability, a likelihood of a brute force attack on the network; based on the first time series, adjusting a boundary between the first parameter value range and the second parameter value range; and determining, based on the adjusted boundary, a second likelihood of a brute force attack.

In Example 30, the subject matter of Example 29 optionally includes the operations further comprising performing, based on the likelihood, a mitigating action.

In Example 31, the subject matter of Example 30 optionally includes wherein the mitigating action includes changing an access control policy of the network.

In Example 32, the subject matter of Example 31 optionally includes wherein the changing of the access control policy comprises programmatically configuring a firewall of the network.

In Example 33, the subject matter of any one or more of Examples 29-32 optionally include wherein the adjusting of the boundary comprises updating a threshold value $\tau\_p$ defining the boundary between the first range and the second range, $\tau\_p$ defined according to: $\tau\_p := E[Y|Y > Q\_(p-1)]$ where: E[ ] is an expected value function, Y is the first time series, tp is a threshold value between the first range and the second range, Qp is a qth quantile of a negative binomial distribution.

In Example 34, the subject matter of any one or more of Examples 29-33 optionally include wherein the adjusting of the boundary further comprises updating parameters defining the first and second distributions based on the first time series.

In Example 35, the subject matter of any one or more of Examples 29-34 optionally include wherein the parameters are updated via exponential smoothing and a grid of smoothing weights.

In Example 36, the subject matter of Example 35 optionally includes wherein at least one parameter of the distribution is updated according to: $\Phi t+\in = g\Phi-1[\eta t+\in]$, where: $\Phi t+\in$ is the updated parameter, $g\Phi$ is a link function for a parameter $\Phi$, $\eta\_(t+\epsilon) = \tilde{\alpha}\_\theta * M\_\Phi\ [y\_(t+\epsilon)|\eta\_t] + (1-\tilde{\alpha}\_\theta) *\eta\_t$, where: $M\_\Phi$ is a central moment corresponding to the parameter $\Phi$, $\tilde{\alpha}\_\theta$ is a smoothing weight, $\eta t$ is $g\Phi[\Phi t]$, $y\_(t+\epsilon)$ is a sample value included in the first time series.

In Example 37, the subject matter of Example undefined optionally includes, wherein the first distribution and the second distribution are included in the finite mixture of distributions.

In Example 38, the subject matter of any one or more of Examples 29-37 optionally include the operations further comprising: determining a second time series for second operational parameter values of the device; selecting, based on the second time series, a second distribution; second comparing the second time series to the selected second distribution; determining, based on the second comparing, a second probability at which second values in the second time series occur in the selected second distribution; applying Fisher's method to the first probability and the second probability; and based on the applying, generating a combined indicator of anomaly, wherein the determining of the likelihood of the brute force attack is further based on the combined indicator.

In Example 39, the subject matter of Example 38 optionally includes wherein the first time series indicates a cumulative number of logins over time that are successful, and the second time series indicates a cumulative number of logins over time that are unsuccessful.

In Example 40, the subject matter of Example 39 optionally includes the operations further comprising generating a third time series indicating user account information associated with each of the logins indicated by the first and second time series, and second applying Fisher's method to the third time series, wherein the generating of the combined indicator is further based on the second applying.

In Example 41, the subject matter of Example 40 optionally includes wherein the logins are remote desktop protocol (RDP) login attempts.

In Example 42, the subject matter of any one or more of Examples 29-41 optionally include wherein the first time series indicates one or more of hour of day and day of week of failed login and RDP connections, timing of successful logins following failed attempts, login type information, login failure reasons, a cumulative count of unique usernames that generated an unsuccessful login without a subsequent successful login, a count of failed login attempts, a count of RDP external IP addresses per device, and counts of two devices having RDP inbound connections from a common device.

We claim:
1. A method performed by hardware processing circuitry, comprising:
    obtaining a first time series of operational parameter values of a device attached to a network;
    comparing the operational parameter values of the first time series to a first parameter value range and a second parameter value range;

determining, based on the comparing, that the operational parameter values of the first time series are within the first parameter value range;

based on the determining, selecting, from a plurality of distributions, a first distribution;

comparing the first time series to the selected first distribution;

determining, based on the comparing the first time series, a first probability at which values of the operational parameter values in the first time series occur in the selected first distribution;

determining, based on the first probability, a likelihood of a brute force attack on the network;

based on the first time series, adjusting a boundary between the first parameter value range and the second parameter value range resulting in at least one of an updated first parameter value range or an updated second parameter value range; and determining, based on the updated first parameter value range or the updated second parameter value range, a second likelihood of a brute force attack.

2. The method of claim 1, further comprising performing, based on the likelihood, a mitigating action.

3. The method of claim 2, wherein the mitigating action includes changing an access control policy of the network.

4. The method of claim 3, wherein the changing of the access control policy comprises programmatically configuring a firewall of the network.

5. The method of claim 1, wherein the adjusting of the boundary comprises updating a threshold value $\tau_p$ defining the boundary between the first parameter value range and the second parameter value range, $\tau_p$ defined according to:

$$\tau_p := E[Y|Y>Q_{p-1}]$$

where:
E[ ] is an expected value function,
Y is the first time series,
$t_p$ is the threshold value between the first parameter value range and the second parameter value range or the updated first parameter value range and the updated second parameter value range, and
$Q_p$ is a qth quantile of a negative binomial distribution.

6. The method of claim 1, wherein the adjusting of the boundary further comprises updating parameters defining the first distribution.

7. The method of claim 6, wherein the parameters are updated via exponential smoothing and a grid of smoothing weights.

8. The method of claim 7, where at least one parameter of the first distribution is updated according to:

$$\Phi_{t+\in} = g_\Phi^{-1}[\eta_{t+\in}],$$

where:
$\Phi_{t+\in}$ is the updated parameter,
$g_\Phi$ is a link function for a parameter $\Phi$,
$\eta_{t+\in} = \tilde{\alpha}_\theta * M_\Phi[y_{t+\in}|\eta_t] + (1-\tilde{\alpha}_\theta) * \eta_t,$
where:
$M_\Phi$, is a central moment corresponding to the parameter $\Phi$,
$\tilde{\alpha}_\theta$ is a smoothing weight,
$\eta_t$ is $g_\Phi[\Phi_t]$, and
$y_{t+\in}$ is a sample value included in the first time series.

9. The method of claim 1, further comprising:
determining a second time series for second operational parameter values of the device;

selecting, based on the second time series, a second distribution;

comparing the second time series to the selected second distribution;

determining, based on the comparing the second time series, a second probability at which second values in the second time series occur in the selected second distribution;

applying Fisher's method to the first probability and the second probability; and based on the applying, generating a combined indicator of anomaly, wherein the determining of the likelihood of the brute force attack is further based on the combined indicator.

10. A system, comprising:
hardware processing circuitry;
one or more hardware memories storing instructions that when executed configure the hardware processing circuitry to perform operations comprising:

obtaining a first time series of operational parameter values of a device attached to a network;

comparing the operational parameter values of the first time series to a first parameter value range and a second parameter value range;

determining, based on the comparing, that the operational parameter values of the first time series are within the first parameter value range;

based on the determining, selecting, from a plurality of distributions, a first distribution;

comparing the first time series to the selected first distribution;

determining, based on the comparing the first time series, a first probability at which values of the operational parameter values in the first time series occur in the selected first distribution;

determining, based on the first probability, a likelihood of a brute force attack on the network;

based on the first time series, adjusting a boundary between the first parameter value range and the second parameter value range resulting in at least one of an updated first parameter value range or an updated second parameter value range; and determining, based on the updated first parameter value range or the updated second parameter value range, a second likelihood of a brute force attack.

11. The system of claim 10, the operations further comprising performing, based on the likelihood, a mitigating action.

12. The system of claim 11, wherein the mitigating action includes changing an access control policy of the network.

13. The system of claim 12, wherein the changing of the access control policy comprises programmatically configuring a firewall of the network.

14. The system of claim 10, wherein the adjusting of the boundary comprises updating a threshold value $\tau_p$ defining the boundary between the first parameter value range and the second parameter value range, $\tau_p$ defined according to:

$$\tau_p := E[Y|Y>Q_{p-1}]$$

where:
E[ ] is an expected value function,
Y is the first time series,
$t_p$ is the threshold value between the first parameter value range and the second parameter value range or the updated first parameter value range and the updated second parameter value range, and
$Q_p$ is a qth quantile of a negative binomial distribution.

15. The system of claim 10, wherein the adjusting of the boundary further comprises updating parameters defining the first distribution.

16. The system of claim 15, wherein the parameters are updated via exponential smoothing and a grid of smoothing weights.

17. The system of claim 16, where at least one parameter of the first distribution is updated according to:

$$\Phi_{t+\epsilon} = g_\Phi^{-1}[\eta_{t+\epsilon}],$$

where:
- $\Phi_{t+\epsilon}$ is the updated parameter,
- $g_\Phi$ is a link function for a parameter $\Phi$,
- $\eta_{t+\epsilon} = \tilde{\alpha}_\theta * M_\Phi[y_{t+\epsilon}|\eta_t] + (1-\tilde{\alpha}_\theta)*\eta_t$, where:
- $M_\Phi$ is a central moment corresponding to the parameter $\Phi$,
- $\tilde{\alpha}_\theta$ is a smoothing weight,
- $\eta_t$ is $g_\Phi[\Phi_t]$, and
- $y_{t+\epsilon}$ is a sample value included in the first time series.

18. The system of claim 10, the operations further comprising modeling a distribution of the first time series as a finite mixture of distributions $P1[Y|\Theta 1], \ldots Pm[Y|\Theta m]$, where each parameter $\Theta_p$ is a stochastic process.

19. The system of claim 18, wherein the first distribution is included in the finite mixture of distributions.

20. A non-transitory computer readable storage medium comprising instructions that when executed configure hardware processing circuitry to perform operations, comprising:

obtaining a first time series of operational parameter values of a device attached to a network;

comparing the operational parameter values of the first time series to a first parameter value range and a second parameter value range;

determining, based on the comparing, that the operational parameter values of the first time series are within the first parameter value range;

based on the determining, selecting, from a plurality of distributions, a first distribution;

comparing the first time series to the selected first distribution;

determining, based on the comparing the first time series, a first probability at which values of the operational parameter values in the first time series occur in the selected first distribution;

determining, based on the first probability, a likelihood of a brute force attack on the network;

based on the first time series, adjusting a boundary between the first parameter value range and the second parameter value range resulting in at least one of an updated first parameter value range or an updated second parameter value range; and determining, based on the updated first parameter value range or the updated second parameter value range, a second likelihood of a brute force attack.

\* \* \* \* \*